United States Patent
Takeyama

(10) Patent No.: US 11,294,258 B2
(45) Date of Patent: Apr. 5, 2022

(54) TRANSMISSION DEVICE AND TRANSMISSION SYSTEM

(71) Applicant: FUJITSU LIMITED, Kawasaki (JP)

(72) Inventor: Tomoaki Takeyama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/876,254

(22) Filed: May 18, 2020

(65) Prior Publication Data

US 2020/0371292 A1 Nov. 26, 2020

(30) Foreign Application Priority Data

May 22, 2019 (JP) .............................. JP2019-095823

(51) Int. Cl.
| | |
|---|---|
| *G02F 1/35* | (2006.01) |
| *G02B 6/293* | (2006.01) |
| *G02B 6/02* | (2006.01) |
| *H04J 14/02* | (2006.01) |
| *G02B 6/12* | (2006.01) |

(52) U.S. Cl.
CPC ....... *G02F 1/3536* (2013.01); *G02B 6/02233* (2013.01); *G02B 6/12004* (2013.01); *G02B 6/29386* (2013.01); *H04J 14/0234* (2013.01); *H04J 14/0236* (2013.01)

(58) Field of Classification Search
CPC ............ G02B 6/02233; G02B 6/12004; G02B 6/29386; H04B 10/506; H04J 14/0234; H04J 14/0236; H04J 14/0256
USPC ........................................................ 359/326
See application file for complete search history.

(56) References Cited

U.S. PATENT DOCUMENTS

| | | | | |
|---|---|---|---|---|
| 5,798,853 | A * | 8/1998 | Watanabe | .......... H04B 10/2531 |
| | | | | 359/300 |
| 6,459,525 | B1 | 10/2002 | Aso et al. | |
| 10,567,081 | B2 * | 2/2020 | Mori | .................... H04J 14/0278 |
| 10,644,823 | B2 * | 5/2020 | Yuki | ..................... H04B 10/66 |
| 10,855,393 | B2 * | 12/2020 | Yuki | .................... H04J 14/0212 |

(Continued)

FOREIGN PATENT DOCUMENTS

| | | |
|---|---|---|
| JP | H09-230404 A | 9/1997 |
| JP | 2001-075136 A | 3/2001 |

OTHER PUBLICATIONS

Gao et al.; Wavelength conversion of spectrum sliced broadband amplified spontaneous emission light by hybrid four—wave mixing in highly non-linear, dispersion-shifted fibers; Apr. 2006; Optical Society of America; ; pp. 1-7. (Year: 2006).*

*Primary Examiner* — Amritbir K Sandhu
(74) *Attorney, Agent, or Firm* — Fujitsu Patent Center

(57) ABSTRACT

A transmission device includes: a first wavelength conversion circuit configured to convert a wavelength band of a wavelength multiplexed signal light based on a wavelength of a second excitation light by performing four-wave mixing on the second excitation light and the wavelength multiplexed signal light inputted to a second nonlinear medium; and a second wavelength conversion circuit configured to convert the wavelength band of the wavelength multiplexed signal light based on a difference between frequencies of a third excitation light and a fourth excitation light by performing four-wave mixing on the third excitation light and the fourth excitation light and the wavelength multiplexed signal light inputted to a third nonlinear medium.

10 Claims, 15 Drawing Sheets

(56) References Cited

U.S. PATENT DOCUMENTS

| | | | |
|---|---|---|---|
| 2011/0199672 A1* | 8/2011 | Takeyama | H04B 10/2941 |
| | | | 359/337 |
| 2017/0307957 A1* | 10/2017 | Kato | H04B 10/532 |
| 2019/0146306 A1* | 5/2019 | Mori | G02F 1/3536 |
| | | | 359/326 |
| 2019/0353978 A1* | 11/2019 | Takeyama | H04B 10/505 |
| 2019/0386767 A1* | 12/2019 | Yuki | H04J 14/0227 |
| 2020/0371292 A1* | 11/2020 | Takeyama | H04J 14/0256 |

* cited by examiner

TRANSMISSION DEVICE AND TRANSMISSION SYSTEM

CROSS-REFERENCE TO RELATED APPLICATION

This application is based upon and claims the benefit of priority of the prior Japanese Patent Application No. 2019-95823, filed on May 22, 2019, the entire contents of which are incorporated herein by reference.

FIELD

The embodiments discussed herein are related to a transmission device and a transmission system.

BACKGROUND

There is a technique for converting the wavelength of signal light by generating four-wave mixing of excitation light and signal light in a nonlinear fiber. This technology allows batch conversion of wavelength bands of wavelength multiplexed signal light, thus enabling high-capacity transmission by multiplexing a plurality of wavelength multiplexed signal lights having different wavelength bands and transmitting the wavelength multiplexed signal light to one transmission line.

Examples of the related art include Japanese Laid-open Patent Publication Nos. 9-230404 and 2001-75136.

SUMMARY

According to an aspect of the embodiments, a transmission device configured to receive wavelength multiplexed signal light from a first transmission device, the first transmission device being configured to convert the wavelength band of the wavelength multiplexed signal light based on the wavelength of a first excitation light by performing four-wave mixing on the first excitation light and the wavelength multiplexed signal light inputted to a first nonlinear medium, the transmission device includes: a first wavelength conversion circuit that includes a first light source and a second nonlinear medium, the first light source being configured to output a second excitation light, the first wavelength conversion circuit being configured to convert the wavelength band of the wavelength multiplexed signal light based on the wavelength of the second excitation light by performing four-wave mixing on the second excitation light and the wavelength multiplexed signal light inputted to the second nonlinear medium; and a second wavelength conversion circuit that includes a second light source and a third light source and a third nonlinear medium, the second light source being configured to output a third excitation light, the third light source being configured to output a fourth excitation light, the second wavelength conversion circuit being configured to convert the wavelength band of the wavelength multiplexed signal light based on a difference between the frequencies of the third excitation light and the fourth excitation light by performing four-wave mixing on the third excitation light and the fourth excitation light and the wavelength multiplexed signal light inputted to the third nonlinear medium, wherein the wavelength of the first excitation light is set to a zero-dispersion wavelength of the first nonlinear medium, the first wavelength conversion circuit is configured to set the wavelength of the second excitation light to the zero-dispersion wavelength of the second nonlinear medium, the second wavelength conversion circuit is configured to set the wavelengths of the third excitation light and the fourth excitation light so that the difference between the frequencies of the third excitation light and the fourth excitation light takes a value based on a difference between a frequency converted from the zero-dispersion wavelength of the first nonlinear medium and a frequency converted from the zero-dispersion wavelength of the second nonlinear medium.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

Four-wave mixing used for wavelength conversion includes degenerate four-wave mixing using one excitation light and non-degenerate four-wave mixing using two excitation lights. In the case of non-degenerate four-wave mixing, the angle formed by the polarization of each excitation light in a nonlinear fiber is displaced from, for example, an orthogonal state to an equilibrium state due to the wavelength dependence of polarization mode dispersion (PMD). Therefore, the larger the wavelength difference between the excitation lights, the more unnecessary crosstalk light may be generated, leading to possible deterioration of the wavelength multiplexed signal light.

Since only one excitation light is used in degenerate four-wave mixing, there is little risk of deterioration of the wavelength multiplexed signal light; however, the degree of reduction in the conversion band due to the difference between the excitation light wavelength and the zero-dispersion wavelength of the nonlinear fiber is larger than that in the case of non-degenerate four-wave mixing.

On the other hand, although reduction in conversion band may be suppressed by making the wavelength of the excitation light coincide with the zero-dispersion wavelength, variation in zero-dispersion wavelength from one nonlinear fiber to another causes an error, from a target value, in the wavelength after the wavelength conversion on the transmission side and the reception side of the wavelength multiplexed signal light. Therefore, there is a problem that the wavelength of the signal light included in the wavelength multiplexed signal light at the time of reception is shifted from the wavelength of the signal light included in the wavelength multiplexed signal light at the time of transmission.

In the case of transmitting wavelength multiplexed signal light including signal light corresponding to an International Telecommunication Union (ITU) grid, for example, even when an arrayed waveguide gratings (AWG) corresponding to the wavelength of the ITU grid is provided as wavelength separation means on the reception side, the signal light may not be separated due to the shift in wavelength. For this reason, there is an inconvenience that a highly versatile AWG may not be used.

Therefore, it is an object of the present disclosure to provide a transmission device, a transmission system, and a transmission method capable of reducing a shift in wavelength band of wavelength multiplexed signal light between transmission side and reception side.

As one aspect, a shift in the wavelength band of the wavelength multiplexed signal light between the transmission side and the reception side may be reduced.

COMPARATIVE EXAMPLE

Figure 1:
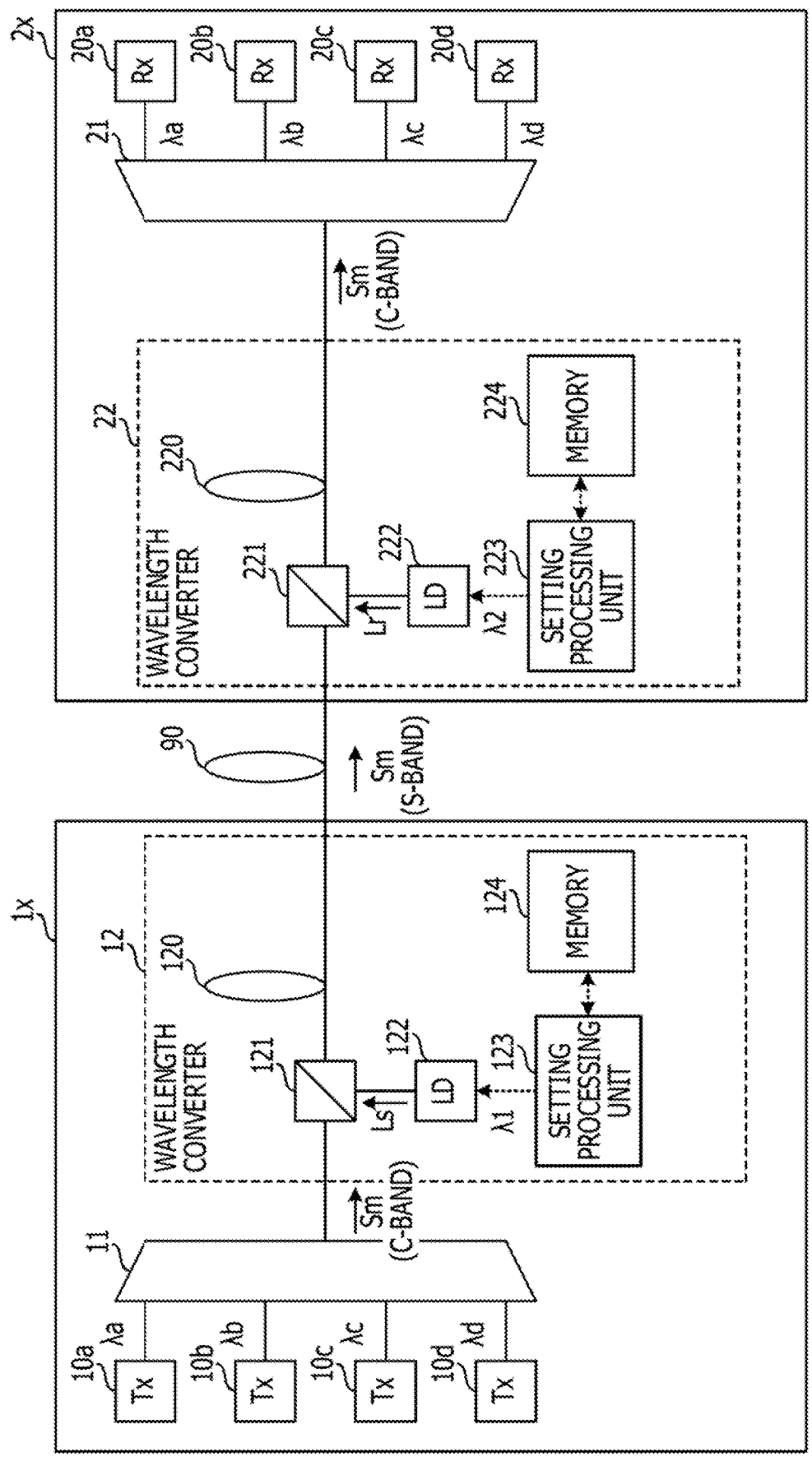
FIG. 1 is a configuration diagram illustrating an example of a transmission system of a comparative example.

FIG. 1 is a configuration diagram illustrating an example of a transmission system of a comparative example. The transmission system includes a transmission device 1x on the transmission side and a transmission device 2x on the reception side. The transmission device 1x on the transmission side transmits wavelength multiplexed signal light Sm via a transmission line 90 such as an optical fiber. The transmission device 2x on the reception side receives the wavelength multiplexed signal light Sm from the transmission device 1x on the transmission side via the transmission line 90.

The transmission device 1x includes transmitters 10a to 10d, an AWG 11, and a wavelength converter 12. The transmitters 10a to 10d are, for example, transponders, that output signal light having wavelengths λa to λd in the C band to the AWG 11 by a digital coherent optical transmission method, for example. Each of the transmitters 10a to 10b has, for example, a light source for transmitting light, an optical modulator, and the like.

Signal lights are inputted to the AWG 11 from the transmitters 10a to 10d, respectively. The AWG 11 has light input ports corresponding to the wavelengths λa to λd of the respective signal lights. The wavelengths λa to λd have wavelength intervals according to the ITU grid, for example. The AWG 11 generates a C-band wavelength multiplexed signal light Sm by wavelength-multiplexing the signal lights, and outputs the generated light to the wavelength converter 12.

The wavelength converter 12 converts the wavelength band of the wavelength multiplexed signal light Sm from the C band to the S band as an example. The wavelength converter 12 converts the wavelength band of the wavelength multiplexed signal light Sm by degenerate four-wave mixing of the wavelength multiplexed signal light Sm and the excitation light Ls. For example, the wavelength converter 12 outputs idler light generated by degenerate four-wave mixing as S-band wavelength multiplexed signal light Sm.

The wavelength converter 12 includes a nonlinear fiber 120, a wavelength division multiplexing (WDM) coupler 121, a laser diode (LD) 122, a setting processing unit 123, and a memory 124. The laser diode 122 outputs the excitation light Ls having the wavelength λ1 to the WDM coupler 121.

The excitation light Ls and the wavelength multiplexed signal light Sm are inputted to the WDM coupler 121. The output port of the WDM coupler 121 is coupled to the nonlinear fiber 120. The excitation light Ls and the wavelength multiplexed signal light Sm are multiplexed by the WDM coupler 121 and inputted to the nonlinear fiber 120. Four-wave mixing of the excitation light Ls and the wavelength multiplexed signal light Sm occurs in the nonlinear fiber 120. Thus, the wavelength band of the wavelength multiplexed signal light Sm is converted into the S band. The S-band wavelength multiplexed signal light Sm is outputted from the nonlinear fiber 120 to the transmission line 90.

The setting processing unit 123 sets the wavelength λ1 of the excitation light Ls in the laser diode 122. The wavelength λ1 of the excitation light Ls is stored in the memory 124 in advance, for example. The setting processing unit 123 reads the wavelength λ1 from the memory 124 and sets the wavelength. The wavelength band of the wavelength multiplexed signal light Sm is converted into a position symmetrical with respect to the wavelength λ1 on the wavelength axis.

The setting processing unit 123 may be, for example, a central processing unit (CPU) circuit including a CPU, a read-only memory (ROM), a random-access memory (RAM), and the like, or may be a logic circuit such as a field-programmable gate array (FPGA) or an application-specific integrated circuit (ASIC).

The wavelength multiplexed signal light Sm is inputted from the transmission line 90 to the transmission device 2x on the reception side.

The transmission device 2x includes receivers 20a to 20d, an AWG 21, and a wavelength converter 22.

The wavelength converter 22 converts the wavelength band of the wavelength multiplexed signal light Sm from the S-band to the C-band, for example. The wavelength converter 22 converts the wavelength band of the wavelength multiplexed signal light Sm by degenerate four-wave mixing of the wavelength multiplexed signal light Sm and excitation light Ls. For example, the wavelength converter 22 outputs idler light generated by degenerate four-wave mixing as C-band wavelength multiplexed signal light Sm.

The wavelength converter 12 includes a nonlinear fiber 220, a WDM coupler 221, a laser diode 222, a setting processing unit 223, and a memory 224. The laser diode 222 outputs excitation light Lr having the wavelength λ2 to the WDM coupler 221.

The excitation light Lr and the wavelength multiplexed signal light Sm are inputted to the WDM coupler 221. The output port of the WDM coupler 221 is coupled to the nonlinear fiber 220. The excitation light Lr and the wavelength multiplexed signal light Sm are multiplexed by the WDM coupler 221 and inputted to the nonlinear fiber 220. Four-wave mixing of the excitation light Lr and the wavelength multiplexed signal light Sm occurs in the nonlinear fiber 220. Thus, the wavelength band of the wavelength multiplexed signal light Sm is converted into the C band. The C-band wavelength multiplexed signal light Sm is outputted from the nonlinear fiber 220 to the AWG 21.

The setting processing unit 223 sets the wavelength $\lambda 2$ of the excitation light Lr in the laser diode 222. The wavelength $\lambda 2$ of the excitation light Lr is stored in advance in the memory 224, for example. The wavelength band of the wavelength multiplexed signal light Sm is converted into a position symmetrical with respect to the wavelength $\lambda 2$ on the wavelength axis.

The setting processing unit 223 reads the wavelength $\lambda 2$ from the memory 224 and sets the wavelength. The setting processing unit 223 may be a CPU circuit including, for example, a CPU, a ROM, and a RAM, or may be a logic circuit such as an FPGA or an ASIC.

The AWG 21 separates the wavelength multiplexed signal light Sm into signal lights having wavelengths $\lambda a$ to $\lambda d$, respectively. The AWG 21 has light output ports corresponding to the wavelengths $\lambda a$ to $\lambda d$ of the respective signal lights. The signal lights having the wavelengths $\lambda a$ to $\lambda d$ are inputted to the receivers 20a to 20d, respectively, from the AWG 21.

The receivers 20a to 20d receive the signal lights having the wavelengths $\lambda a$ to $\lambda d$, respectively, according to a digital coherent optical transmission system, for example. The receivers 20a to 20d each include a local light source, a photodiode, a demodulator, and the like.

Since the wavelength converters 12 and 22 use degenerate four-wave mixing, the degree of reduction in the conversion band due to the differences between the wavelengths $\lambda 1$ and $\lambda 2$ of the excitation lights Ls and Lr and the zero-dispersion wavelengths of the nonlinear fibers 120 and 220 is larger than that in the case of wavelength conversion using non-degenerate four-wave mixing.

Figure 2:
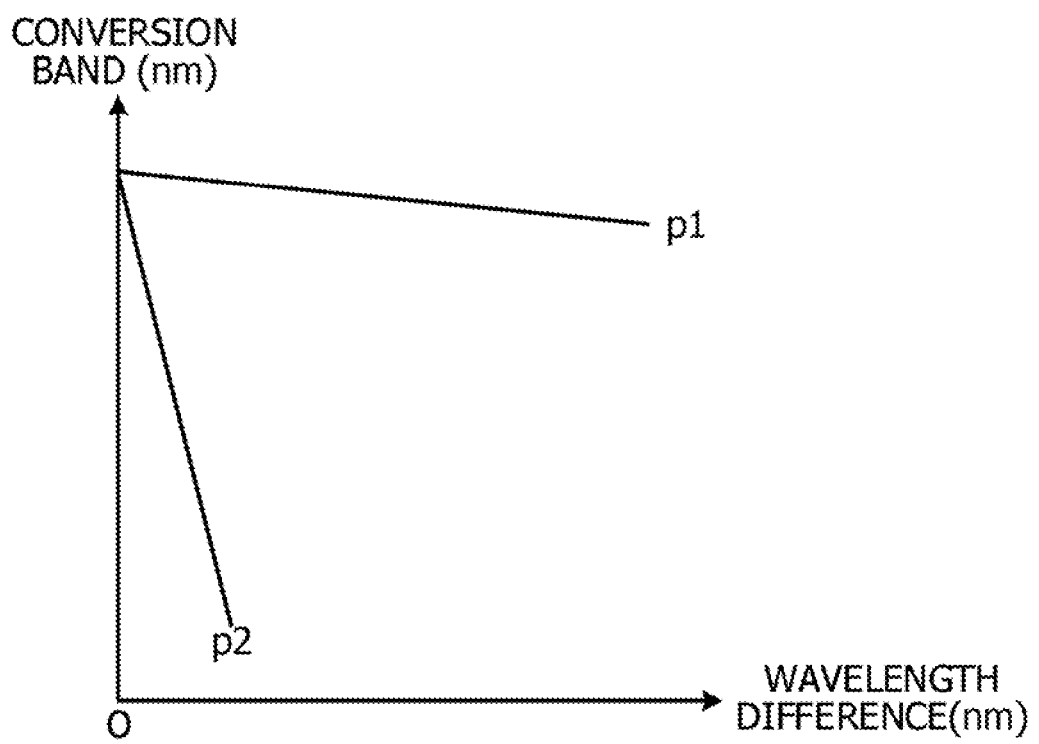
FIG. 2 illustrates an example of a conversion band of wavelength conversion using degenerate four-wave mixing and non-degenerate four-wave mixing.

FIG. 2 illustrates an example of a conversion band of wavelength conversion using degenerate four-wave mixing and non-degenerate four-wave mixing. The horizontal axis represents the wavelength difference between the zero-dispersion wavelength and the wavelength of the excitation light, while the vertical axis represents the conversion band.

Reference numeral p1 denotes a change in the conversion band with respect to the wavelength difference in the case of wavelength conversion using non-degenerate four-wave mixing, while reference numeral p2 denotes a change in the conversion band with respect to the wavelength difference in the case of wavelength conversion using degenerate four-wave mixing. In the case of wavelength conversion using degenerate four-wave mixing, the degree of reduction in the conversion band with respect to the wavelength difference is greater than that in the case of wavelength conversion using non-degenerate four-wave mixing.

On the other hand, although reduction in conversion band may be suppressed by making the wavelengths of the excitation lights Ls and Lr coincide with the zero-dispersion wavelengths of the nonlinear fibers 120 and 220, respectively, variation in zero-dispersion wavelength between the nonlinear fibers 120 and 220 causes an error, from a target value, in the wavelength after the wavelength conversion in the respective wavelength converters 12 and 22.

Therefore, the wavelengths $\lambda a$ to $\lambda d$ of the signal lights included in the wavelength multiplexed signal light Sm transmitted by the transmitters 10a to 10d are shifted from the wavelengths $\lambda a$ to $\lambda d$ of the signal lights included in the wavelength multiplexed signal light Sm inputted to the AWG 21 of the transmission device 2x on the reception side. Therefore, when the input port of the AWG 11 and the output port of the AWG 21 correspond to the wavelength interval of the ITU grid, the AWG 21 may not separate the signal light from the wavelength multiplexed signal light Sm due to the shifts in the wavelengths $\lambda a$ to $\lambda d$ between the transmission side and the reception side. Therefore, there arises an inconvenience that the highly versatile AWGs 11 and 21 may not be used.

First Embodiment

Therefore, in this embodiment, a wavelength converter 23 that performs wavelength conversion using non-degenerate four-wave mixing is added to the transmission device 2 on the reception side. The wavelength converter 23 converts the wavelength band of the wavelength multiplexed signal light Sm so that the shifts in the wavelengths $\lambda a$ to $\lambda d$ of the wavelength multiplexed signal light Sm between the transmission side and the reception side are reduced.

Figure 3:
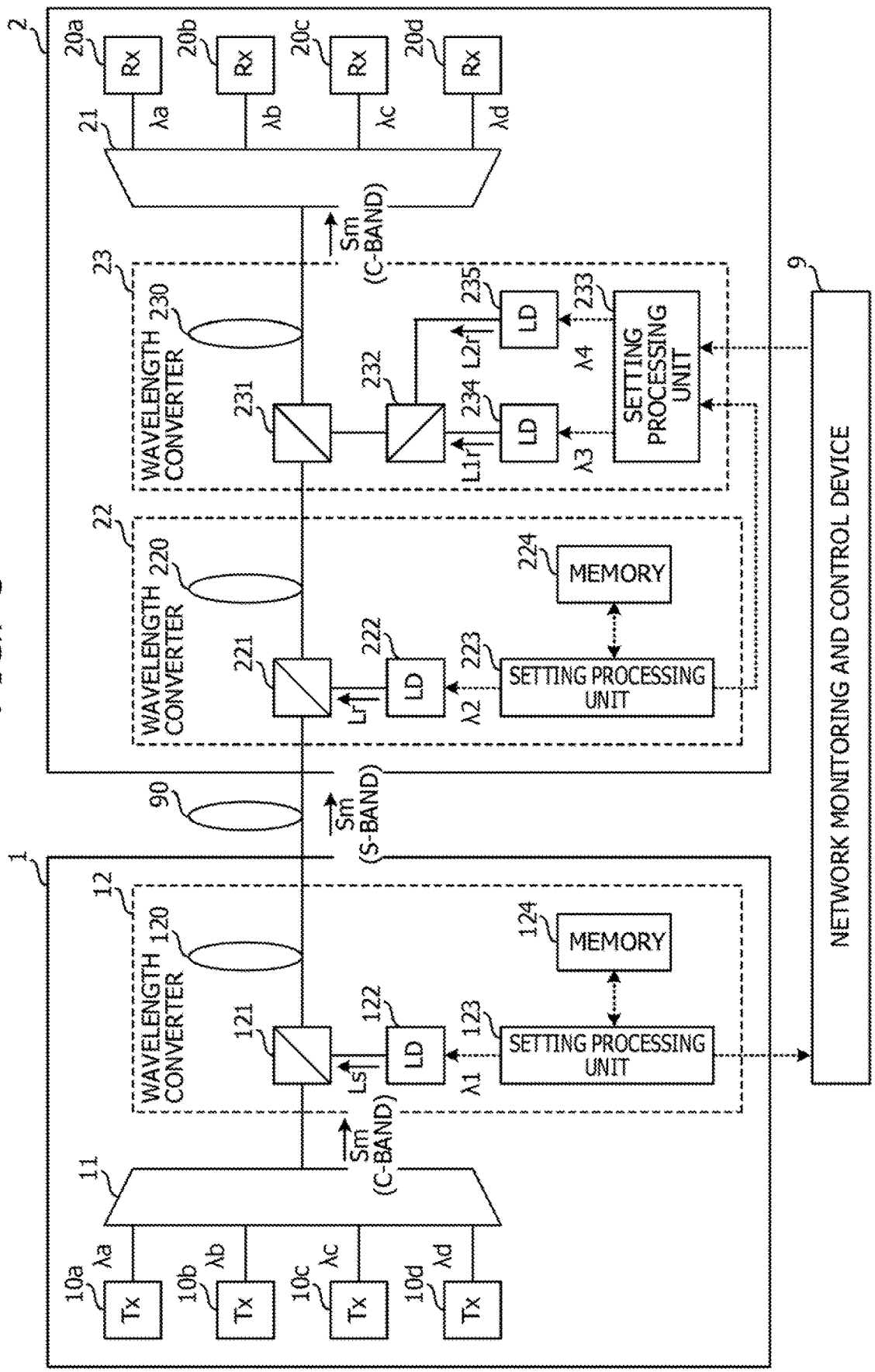
FIG. 3 is a configuration diagram illustrating an example of a transmission system according to a first embodiment.

FIG. 3 is a configuration diagram illustrating an example of a transmission system according to the first embodiment. In FIG. 3, constituents common to those in FIG. 1 are denoted by the same reference numerals, and description thereof is omitted.

The transmission system includes a transmission device 1 on the transmission side and a transmission device 2 on the reception side, which are coupled to each other through a transmission line 90. The transmission device 1 on the transmission side is an example of a first transmission device, and transmits the wavelength multiplexed signal light Sm. The transmission device 2 on the reception side is an example of a second transmission device, and transmits the wavelength multiplexed signal light Sm. A network monitoring and control device 9 monitors and controls the transmission devices 1 and 2 via an unillustrated management network. The transmission device 2 on the reception side is the transmission device of the first embodiment.

The transmission device 1 on the transmission side has the same configuration as the transmission device 1x of the comparative example. The wavelength converter 12 is an example of a transmission-side wavelength conversion unit, and converts the wavelength band of the wavelength multiplexed signal light Sm by four-wave mixing of the excitation light Ls and the wavelength multiplexed signal light Sm inputted to the nonlinear fiber 120 from the C band to the S band based on the wavelength $\lambda 1$ of the excitation light Ls. The nonlinear fiber 120 is an example of a first nonlinear medium, and the laser diode 122 is an example of a transmission-side light source. The excitation light Ls is an example of a first excitation light.

The setting processing unit 123 sets the wavelength $\lambda 1$ of the excitation light Ls to the zero-dispersion wavelength of the nonlinear fiber 120. Therefore, reduction in the conversion band in the wavelength converter 12 is suppressed. The setting processing unit 123 reads the zero-dispersion wavelength of the nonlinear fiber 120 from the memory 124 and sets the zero-dispersion wavelength as the wavelength $\lambda 1$.

The transmission device 2 on the reception side has the same configuration as that of the transmission device 2x of the comparative example, and further includes a wavelength converter 23 that performs wavelength conversion using non-degenerate four-wave mixing. The wavelength converter 23 is coupled between the wavelength converter 22 and the AWG 21.

The wavelength converter 22 is an example of a first wavelength conversion unit, and converts the wavelength band of the wavelength multiplexed signal light Sm by four-wave mixing of the excitation light Lr and the wavelength multiplexed signal light Sm inputted to the nonlinear fiber 220 from the S band to the C band based on the wavelength λ1 of the excitation light Lr. The wavelength of the signal light included in the wavelength multiplexed signal light Sm after conversion by the wavelength converter 22 is shifted from the wavelengths λa to λd of the signal lights transmitted by the transmitters 10a to 10d. The nonlinear fiber 220 is an example of a second nonlinear medium, and the laser diode 222 is an example of a first light source.

The setting processing unit 223 sets the wavelength λ2 of the excitation light Lr to the zero-dispersion wavelength of the nonlinear fiber 220. Therefore, reduction in the conversion band in the wavelength converter 22 is suppressed. The excitation light Lr is an example of a second excitation light. The setting processing unit 223 reads the zero-dispersion wavelength of the nonlinear fiber 220 from the memory 124 and sets the zero-dispersion wavelength as the wavelength λ2.

The wavelength multiplexed signal light Sm is inputted to the wavelength converter 23 from the nonlinear fiber 220. The wavelength converter 23 converts the wavelength band of the wavelength multiplexed signal light Sm so as to reduce the shifts in the wavelengths λa to λd of the wavelength multiplexed signal light Sm between the transmission side and the reception side. The converted wavelength multiplexed signal light Sm is inputted to the AWG 21.

The wavelength converter 23 is an example of a second wavelength conversion unit, and converts the wavelength band of the wavelength multiplexed signal light Sm by means of non-degenerate four-wave mixing. The wavelength converter 23 includes a nonlinear fiber 230, a WDM coupler 231, a polarization beam combiner (PBC) 232, laser diodes 234 and 235, and a setting processing unit 233.

The laser diode 234 outputs an excitation light L1r having a wavelength λ3 to the PBC 232, while the laser diode 235 outputs an excitation light L2r having a wavelength λ4 to the PBC 232. The laser diode 234 is an example of a second light source, and the laser diode 235 is an example of a third light source. The excitation light L1r is an example of a third excitation light, and the excitation light L2r is an example of a fourth excitation light.

The PBC 232 multiplexes the excitation lights L1r and L2r whose polarizations are orthogonal to each other and outputs the multiplexed light to the WDM coupler 231. The WDM coupler 231 multiplexes the multiplexed light of the excitation lights L1r and L2r with the wavelength multiplexed signal light Sm from the wavelength converter 22. The multiplexed light of the excitation lights L1r and L2r and the wavelength multiplexed signal light Sm is inputted from the WDM coupler 231 to the nonlinear fiber 230.

The wavelength converter 23 converts the wavelength band of the wavelength multiplexed signal light Sm by four-wave mixing of the excitation lights L1r and L2r and the wavelength multiplexed signal light Sm in the nonlinear fiber 230. In this event, the amount of wavelength conversion is equal to the difference (|λ3−λ4|) between the wavelengths λ3 and λ4 of the excitation lights L1r and L2r. The nonlinear fiber 230 is an example of a third nor ear medium.

The setting processing unit 233 sets the wavelength λ3 of the excitation light L1r in the laser diode 234, and sets the wavelength λ4 of the excitation light L2r in the laser diode 235. The setting processing unit 233 sets the wavelengths λ3 and λ4 of the excitation lights L1r and L2r so that the difference between the frequencies of the excitation lights L1r and L2r takes a value based on a difference between a frequency converted from the zero-dispersion wavelength (λ1) of the nonlinear fiber 120 and a frequency converted from the zero-dispersion wavelength (λ2) of the nonlinear fiber 220.

As will be described later, shifts in the wavelengths λa to λd of the wavelength multiplexed signal light Sm between the transmission side and the reception side (hereinafter, referred to as "wavelength shift") are based on the difference between the wavelength λ1 of the excitation light Ls on the transmission side and the wavelength λ2 of the excitation light Lr on the reception side. Therefore, the wavelength shift is suppressed.

Figure 4:
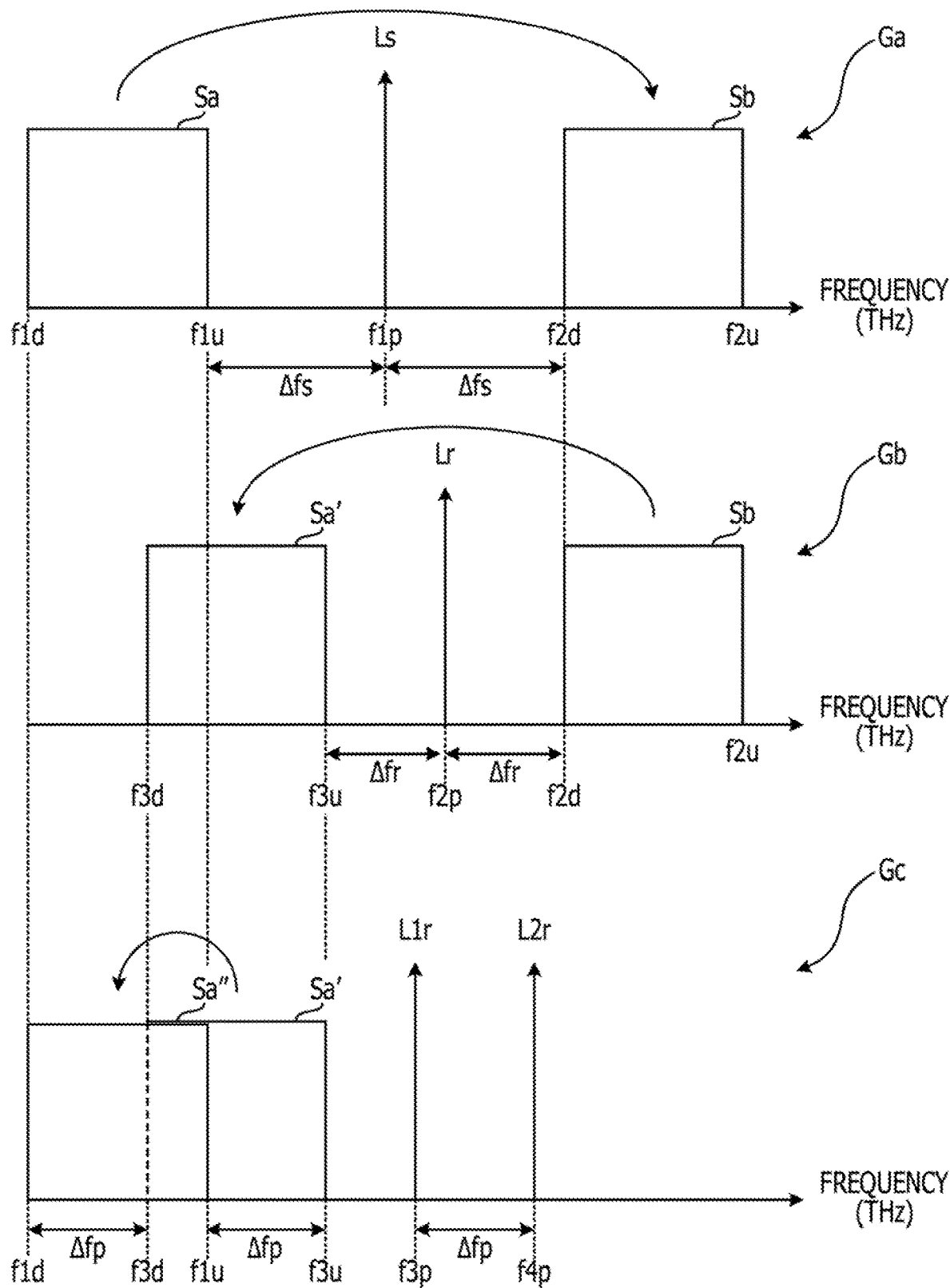
FIG. 4 illustrates an example of wavelength band conversion by a wavelength converter.

FIG. 4 illustrates an example of wavelength band conversion by the wavelength converters 12, 22, and 23. Although description is given of an example where wavelength conversion is performed by frequency conversion, the wavelength may be directly converted.

Reference numeral Ga denotes a frequency spectrum indicating the wavelength conversion by the wavelength converter 12. The frequency of the spectrum Sa of the wavelength multiplexed signal light Sm before conversion ranges from the lower limit f1d to the upper limit f1u. The frequency range of the converted wavelength multiplexed signal light Sm is converted into a position symmetrical with respect to the frequency f1p of the excitation light Ls (see the arrow), The frequency f1p corresponds to a frequency converted from the zero-dispersion wavelength of the nonlinear fiber 120 (=C/λ1, C denotes the speed of light).

$$f2d=f1p+\Delta fs=f1p+(f1p-f1u) \quad (1)$$

$$f2u=f1p+\Delta fs+(f1u-f1d)=f1p+(f1p-fd) \quad (2)$$

The frequency of the spectrum Sb of the converted wavelength multiplexed signal light Sm ranges from the lower limit f2d to the upper limit f2u. The difference Δfs (>0) between the frequency f1p and the upper limit f1u is equal to the difference Δfs between the frequency f1p and the lower limit f2d. Therefore, the lower limit f2d and the upper limit f1u are calculated from the above equations (1) and (2), respectively. Thus, the wavelength converter 12 converts the wavelength band of the wavelength multiplexed signal light Sm based on the frequency f1p or the wavelength λ1.

Reference numeral Gb denotes a frequency spectrum indicating the wavelength conversion by the wavelength converter 22. The frequency range of the wavelength multiplexed signal light Sm is converted into a position symmetrical with respect to the frequency f2p of the excitation light Lr (see the arrow). The frequency f2p corresponds to the frequency (=C/λ2) converted from the zero-dispersion wavelength of the nonlinear fiber 220, and is different from the frequency f1p converted from the zero-dispersion wavelength of the nonlinear fiber 120.

$$f3d=f2p-\Delta fr-(f1u-f1d)=f2p-(f2d-f2p)-(f1u-f1d)=2(f2p-f1p)+f1d \quad (3)$$

$$f3u=f2p-\Delta fr=f2p-(f2d-f2p)=2(f2p-f1p)+f1u \quad (4)$$

The frequency of the spectrum Sa' of the converted wavelength multiplexed signal light Sm ranges from the lower limit f3d to the upper limit f3u. The difference Δfr (>0)

between the frequency f2p and the upper limit f3u is equal to the difference Δfr between the frequency f2p and the lower limit f2d. Therefore, the lower limit f3d and the upper limit f3u are calculated from the above equations (3) and (4), respectively. Thus, the wavelength converter 22 converts the wavelength band of the wavelength multiplexed signal light Sm based on the frequency f2p or the wavelength λ2.

Since the zero-dispersion wavelengths of the nonlinear fibers 120 and 220 differ due to variations, the frequencies f1p and f2p of the excitation lights Ls and Lr also differ. Therefore, the frequency range (f3d to f3u) of the spectrum Sa' of the converted wavelength multiplexed signal light Sm does not match the frequency range (f1d to f1u) of the spectrum Sa of the original wavelength multiplexed signal light Sm.

Reference numeral Gc denotes a frequency spectrum indicating the wavelength conversion by the wavelength converter 23. The frequency range of the wavelength multiplexed signal light Sm moves to the lower frequency side by the difference Δfp (=f4p−f3p) between the frequency f3p (=C/λ3) of the excitation light L1r and the frequency f4p (=1/λ4) of the excitation light. L2r. Thus, the frequency range of the spectrum Sa" of the converted wavelength multiplexed signal light Sm matches the spectrum Sa of the original wavelength multiplexed signal light Sm.

Therefore, the difference Δfp corresponds to the difference between the frequency range (f1d to f1u) of the spectrum Sa (Sa") of the original wavelength multiplexed signal light Sm and the frequency range (f3d to f3u) of the spectrum Sa' of the wavelength multiplexed signal light Sm before conversion. For example, the wavelength converter 23 converts the wavelength band of the wavelength multiplexed signal light Sm based on the difference between the frequencies f1p and f2p.

$$\Delta fp = f3d - f1d = f3u - f1u = 2(f2p - f1p) \quad (5)$$

Therefore, the difference Δfp is calculated from the above equation (5) based on the above equations (1) to (4). For example, the difference Δfp between the frequency f3p of the excitation light L1r and the frequency f4p of the excitation light L2r is twice the difference (f2p−f1p) between the frequency f1p of the excitation light Ls and the frequency f2p of the excitation light Lr.

Therefore, the frequency range of the spectrum Sa" of the wavelength multiplexed signal light Sm having the wavelength converted by the wavelength converter 23 corresponds to the frequency range (f1d to f1u) of the spectrum Sa of the original wavelength multiplexed signal light Sm. Therefore, the wavelengths λa to λd of the signal lights of the wavelength multiplexed signal light Sm transmitted from the transmission device 1 on the transmission side correspond to the wavelengths λa to λd of the signal lights of the wavelength multiplexed signal light Sm received by the transmission device on the reception side.

Referring to FIG. 3, the setting processing unit 233 of the wavelength converter 23 acquires the wavelengths λ1 and λ2 of the excitation lights Ls and Lr, for example, the zero-dispersion wavelengths of the nonlinear fibers 120 and 220 from the other wavelength converters 12 and 22 via the network monitoring and control device 9. In this event, the wavelength converters 12 and 22 read the wavelengths λ1 and λ2 from the memories 124 and 224 in response to a request from the network monitoring and control device 9, and notify the network monitoring and control device 9 of the wavelengths. The network monitoring and control device 9 notifies the wavelengths λ1 and λ2 to the setting processing unit 233 of the wavelength converter 23.

The setting processing unit 233 calculates a difference (f2p−f1p) between the frequencies f1p and f2p of the excitation lights L1r and L2r from the wavelengths α1 and α2. The setting processing unit 223 converts the zero-dispersion wavelengths (λ1 and λ2) of the nonlinear fibers 120 and 220 into frequencies (f1p and f2p). The setting processing unit 233 sets the wavelengths λ3 and λ4 of the excitation lights L1r and L2r in the laser diodes 234 and 235, respectively, so that the difference between the frequencies of the excitation lights L1r and L2r takes a value based on the difference (f2p−f1p) between the frequencies f1p and f2p converted from the zero-dispersion wavelengths of the nonlinear fibers 120 and 220.

For example, the setting processing unit 233 selects a set of wavelengths having a difference between the values obtained by multiplying the reciprocal of the wavelength by the light speed C (for example, the frequencies), which is close to twice the difference (f2p−f1p) between the frequency f1p of the excitation light Ls and the frequency f2p of the excitation light Lr, from among the wavelengths that may be set for the laser diodes 234 and 235. Thus, the wavelength band of the wavelength multiplexed signal light Sm after the wavelength conversion by the wavelength converter 23 approaches the wavelength band of the original wavelength multiplexed signal light Sm in the transmission device 1 on the transmission side.

Therefore, a shift is reduced between the wavelength band of the wavelength multiplexed signal light Sm transmitted from the transmission device 1 on the transmission side and the wavelength band of the wavelength multiplexed signal light Sm received by the transmission device on the reception side.

For example, there may be a case where a set of wavelengths having a difference between the values obtained by multiplying the reciprocal of the wavelength by the light speed C, which is twice the difference (f2p−f1p) between the frequency f1p of the excitation light Ls and the frequency f2p of the excitation light Lr, may be selected from among the wavelengths that may be set for the laser diodes 234 and 235.

The setting processing unit 233 sets the wavelengths λ3 and λ4 of the excitation lights L1r and L2r for the laser diodes 234 and 235, respectively, so that the difference between the frequencies of the excitation lights L1r and L2r takes a value twice the difference (f2p−f1p) between the frequencies f1p and f2p converted from the zero-dispersion wavelength of the nonlinear fibers 120 and 220. Thus, it is made possible for the wavelength band of the wavelength multiplexed signal light Sm transmitted from the transmission device 1 on the transmission side and the wavelength band of the wavelength multiplexed signal light Sm received by the transmission device on the reception side to coincide with each other with high accuracy.

The wavelength converter 23 converts the wavelength band by means of non-degenerate four-wave mixing. Therefore, the larger the wavelength difference between the excitation lights L1r and L2r, the more unwanted crosstalk light is generated, leading to possible deterioration of the wavelength multiplexed signal light Sm. As described with reference to FIG. 4, since the wavelength converter 23 reduces the wavelength shift after the wavelength conversion by the other wavelength converters 12 and 22, the wavelength conversion amount is smaller than those of the other wavelength converters 12 and 22. Therefore, the wavelength difference between the excitation lights L1r and L2r may be small, and the generation of crosstalk light is suppressed.

Figure 5:
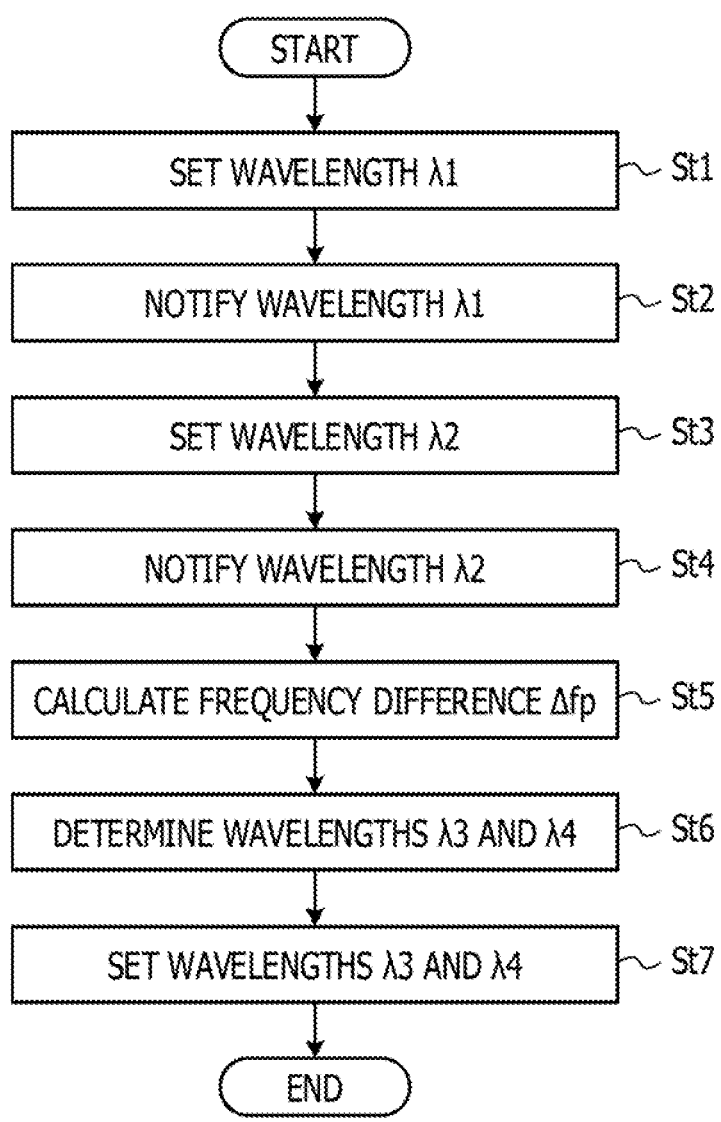
FIG. 5 is a flowchart illustrating an example of wavelength setting processing by the transmission system.

FIG. 5 is a flowchart illustrating an example of processing of setting the wavelengths λ1 to λ4 by the transmission system. This processing is an example of a transmission method, and is executed, for example, in setting processing (provisioning) when starting or resuming operation of the transmission system.

In the transmission device 1 on the transmission side, the setting processing unit 133 of the wavelength converter 12 reads the wavelength λ1 of the excitation light Ls from the memory 124 and sets the wavelength λ1 in the laser diode 122 (Step St1). The memory 124 may store the zero-dispersion wavelength of the nonlinear fiber 120 or a zero dispersion frequency. When the zero dispersion frequency is stored, the setting processing unit 133 calculates the wavelength λ1 by converting the zero dispersion frequency into the zero-dispersion wavelength.

Next, the setting processing unit 133 notifies the setting processing unit 233 of the wavelength converter 23 on the reception side of the wavelength λ1 via the network monitoring and control device 9 (Step St2). The setting processing unit 133 may notify the zero dispersion frequency of the nonlinear fiber 120 instead of the wavelength λ1. In this case, the setting processing unit 233 calculates the wavelength λ1 by converting the zero-dispersion frequency into the zero-dispersion wavelength.

In the transmission device 2 on the reception side, the setting processing unit 223 of the wavelength converter 22 using degenerate four-wave mixing reads the wavelength λ2 of the excitation light Lr from the memory 224 and sets the wavelength λ2 in the laser diode 222 (Step St3). The wavelength λ2 corresponds to the zero-dispersion wavelength of the nonlinear fiber 120.

The memory 224 may store the zero-dispersion wavelength of the nonlinear fiber 220 or a zero dispersion frequency. When the zero dispersion frequency is stored, the setting processing unit 233 calculates the wavelength λ2 by converting the zero dispersion frequency into a zero-dispersion wavelength.

Then, the setting processing unit 223 notifies the wavelength λ2 to the setting processing unit 233 of the wavelength converter 23 using non-degenerate four-wave mixing via an in-device bus, for example (Step St4). The setting processing unit 223 may notify the zero dispersion frequency of the nonlinear fiber 220 instead of the wavelength λ2. In this case, the setting processing unit 233 calculates the wavelength λ2 by converting the zero-dispersion frequency into the zero-dispersion wavelength. The order of the processing in Steps St1 and St2 and the processing in Steps St3 and St4 may be reversed.

Next, the setting processing unit 233 of the wavelength converter 23 converts the wavelengths λ1 and λ2 notified from the other setting processing units 123 and 223 into frequencies f1p and f2p, respectively, to calculate a difference Δfp between the frequencies f1p and f2p (Step St5). Then, the setting processing unit 233 determines the wavelengths λ3 and λ4 of the excitation lights L1r and L2r so that the difference between the frequencies f3p and f4p of the excitation lights L1r and L2r takes a value that is twice or close to twice the difference Δfp between the frequencies f1p and f2p (Step St6).

Thereafter, the setting processing unit 233 sets the determined wavelengths λ3 and λ4 for the laser diodes 234 and 234, respectively (Step St7). Thus, the transmission system executes the processing of setting the wavelengths λ1 to λ4.

Second Embodiment

Although the setting processing unit 233 of the transmission device 2 on the reception side acquires the wavelength λ1 from the setting processing unit 123 of the transmission device 1 on the transmission side via the network monitoring and control device 9 in the first embodiment, the embodiments are not limited thereto. The information on the wavelength λ1 may be notified through a monitoring signal light Sc, for example, related to monitoring and control of the transmission devices 1 and 2.

Figure 6:
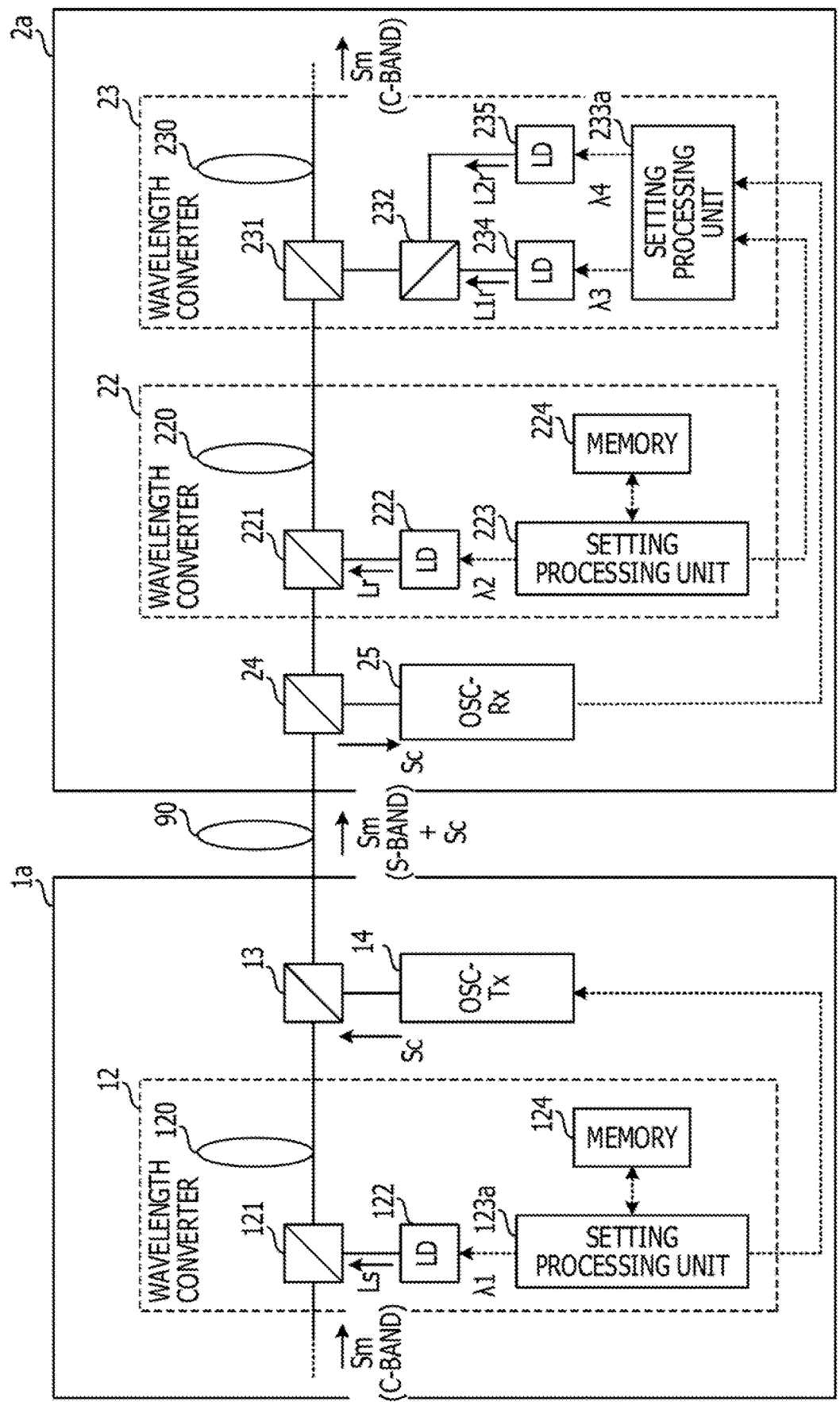
FIG. 6 is a configuration diagram illustrating a transmission system according to a second embodiment.

FIG. 6 is a configuration diagram illustrating a transmission system according to the second embodiment. In FIG. 6, constituents common to those in FIG. 3 are denoted by the same reference numerals, and description thereof is omitted.

The transmission device 1a on the transmission side multiplexes the monitoring signal light Sc with the wavelength multiplexed signal light Sm and transmits the multiplexed light to the transmission device 2a on the reception side. The monitoring signal light Sc includes wavelength information indicating the wavelength λ1 of the excitation light Ls, for example, the zero-dispersion wavelength of the nonlinear fiber.

The transmission device 1a on the transmission side includes a monitoring signal transmission unit (OSC-Tx) 14 and a WDM coupler 13 in addition to the configuration of the transmission device 1 described above. The wavelength converter 12 includes a setting processing unit 123a instead of the setting processing unit 123. The setting processing unit 123a notifies wavelength λ1 to the monitoring signal transmission unit 14, instead of the network monitoring and control device 9, while the other functions thereof are the same as those of the setting processing unit 123.

The monitoring signal transmission unit 14 is an example of a transmission unit, which generates the monitoring signal light Sc including the wavelength information on the wavelength λ1 inputted from the setting processing unit 123a and outputs the generated monitoring signal light Sc to the WDM coupler 13. The monitoring signal transmission unit 14 is an optical transceiver such as a small form-factor pluggable (SFP), for example.

The WDM coupler 13 is coupled between the nonlinear fiber 120 of the wavelength converter 12 and the transmission line 90. The WDM coupler 13 combines the monitoring signal light Sc inputted from the monitoring signal transmission unit 14 with the wavelength multiplexed signal light Sm inputted from the nonlinear fiber 120. The multiplexed light of the wavelength multiplexed signal light Sm and the monitoring signal light Sc is outputted to the transmission line 90, and then inputted from the transmission line 90 to the transmission device 2a on the reception side.

The transmission device 2a on the reception side includes a monitoring signal reception unit (OSC-Rx) 25 and a WDM coupler 24 in addition to the configuration of the transmission device 2 described above. The WDM coupler 24 is coupled between the WDM coupler 221 of the wavelength converter 22 and the transmission line 90. The WDM coupler 24 separates the wavelength multiplexed signal light Sm and the monitoring signal light Sc from the multiplexed light inputted from the transmission line 90. The wavelength multiplexed signal light Sm is inputted to the WDM coupler 221, while the monitoring signal light Sc is inputted to the monitoring signal reception unit 25.

The monitoring signal reception unit 25 is an example of a reception unit, which receives the monitoring signal light Sc from the transmission device 1a. The monitoring signal reception unit 25 converts the monitoring signal light Sc into an electrical monitoring signal and outputs the electrical monitoring signal to the wavelength converter 23. The monitoring signal reception unit 25 is an optical transceiver such as an SFP, for example.

The wavelength converter 23 includes a setting processing unit 233a instead of the setting processing unit 233. The setting processing unit 233a is notified of the wavelength λ1 not by the network monitoring and control device 9 but through the monitoring signal light Sc, while the other functions thereof are the same as those of the setting processing unit 233.

The setting processing unit 233a acquires the wavelength λ1 of the excitation light Ls from the wavelength information included in the monitoring signal light, and converts the wavelength λ1 into the frequency f1p. The setting processing unit 233a acquires the wavelength λ2 of the excitation light Lr, for example, the zero-dispersion wavelength of the nonlinear fiber 220, from the setting processing unit 223 of the other wavelength converter 22, and converts the wavelength λ2 into the frequency f2p. Thus, the setting processing unit 233a calculates the difference Δfp between the frequencies f1p and f2p of the excitation lights Ls and Lr.

Thus, in this embodiment, the setting processing unit 233a may acquire the wavelength λ1 of the excitation light Ls of the wavelength converter 12 in the transmission device 1a on the transmission side without going through the network monitoring and control device 9. Therefore, the setting processing unit 233a may acquire the wavelength λ1 with low delay.

Third Embodiment

Although the setting processing units 233 and 233a calculate the difference Δfp between the frequencies f1p and f2p of the excitation light Ls and Lr in the first and second embodiments, the network monitoring and control device 9a, instead of the setting processing units 233 and 233a, may calculate the difference Δfp.

Figure 7:
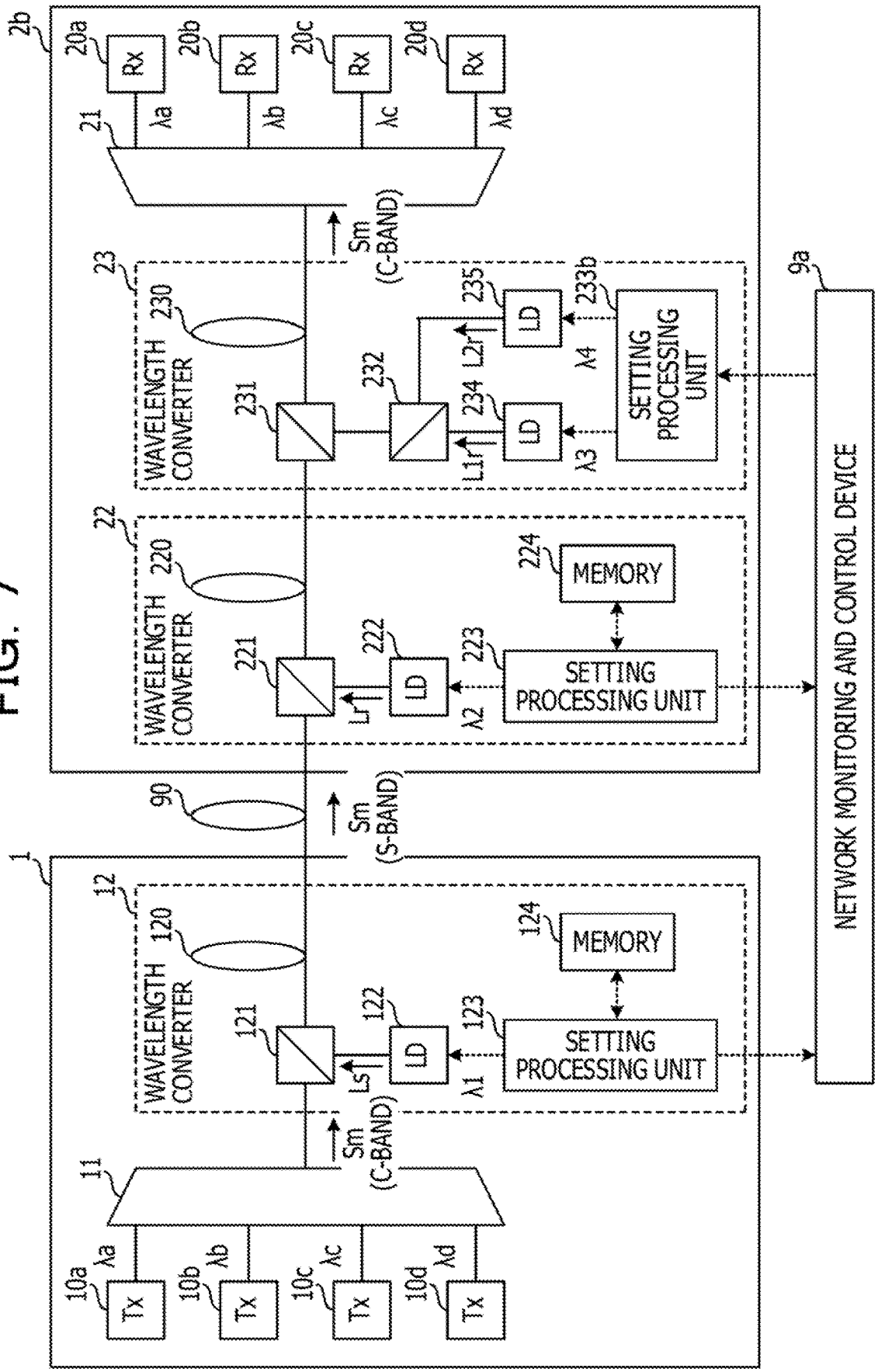
FIG. 7 is a configuration diagram illustrating a transmission system according to a third embodiment.

FIG. 7 is a configuration diagram illustrating a transmission system according to the third embodiment. In FIG. 7, constituents common to those in FIG. 3 are denoted by the same reference numerals, and description thereof is omitted.

The network monitoring and control device 9a is notified of the wavelengths λ1 and λ2 of the excitation lights Ls and Lr by the wavelength converters 12 and 22, as in the case of the network monitoring and control device 9 described above. The network monitoring and control device 9a converts the wavelengths λ1 and λ2 of the excitation lights Ls and Lr into frequencies f1p and f2p to calculate a difference Δfp between the frequencies f1p and f2p. The network monitoring and control device 9a notifies the wavelength converter 23 in the transmission device 2b on the reception side of the difference Δfp.

The wavelength converter 23 includes a setting processing unit 233b instead of the setting processing unit 233 described above. The setting processing unit 233b is notified of the difference Δfp by the network monitoring and control device 9a, while the other functions thereof are the same as those of the setting processing unit 233. The setting processing unit 233 determines the wavelengths λ3 and λ4 of the excitation lights L1r and L2r based on the difference Δfp.

Next, the configuration of the network monitoring and control device 9a will be described.

Figure 8:
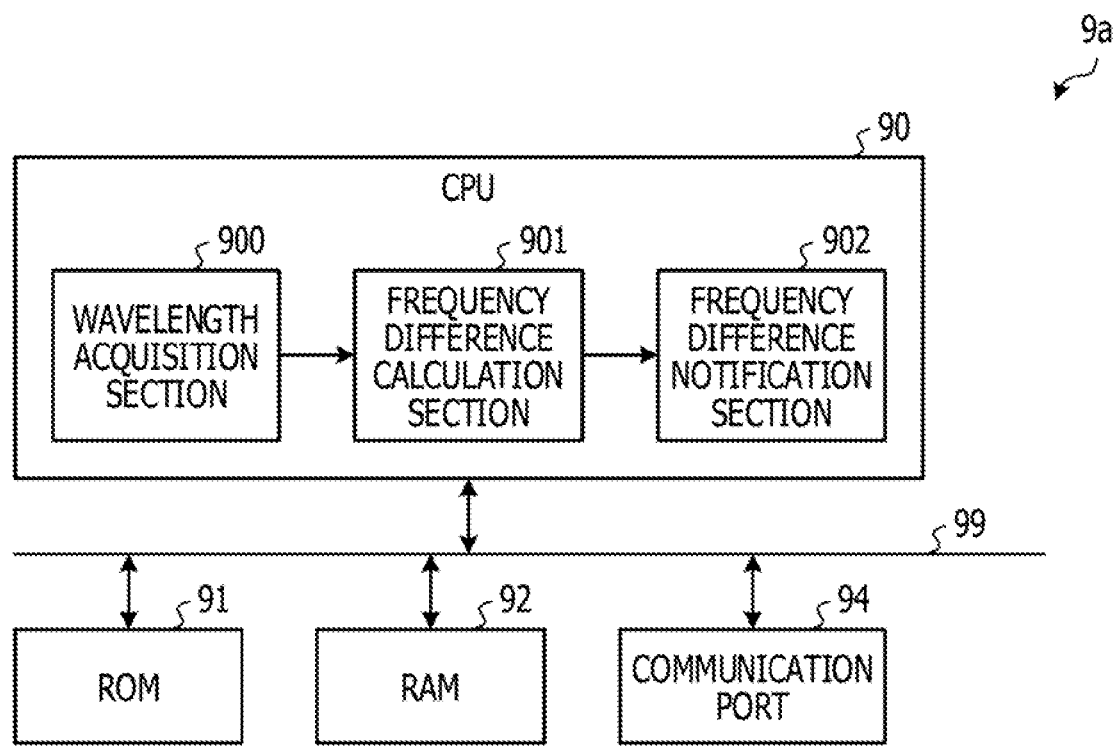
FIG. 8 is a configuration diagram illustrating an example of a network monitoring and control device.

FIG. 8 is a configuration diagram illustrating an example of the network monitoring and control device 9a. The network monitoring and control device 9a includes a CPU 90, a ROM 91, a RAM 92, and a communication port 94. The CPU 90 is coupled to the ROM 91, the RAM 92, and the communication port 94 via a bus 99 so as to enable mutual inputting/outputting of signals. The CPU 90 is an example of a computer which operates according to programs.

The ROM 91 has a program stored therein for driving the CPU 90. The RAM 92 functions as a working memory for the CPU 90. The communication port 94 is, for example, a wireless local area network (LAN) card or a network interface card (NIC) and communicates with the setting processing units 123, 223, and 233b in the respective transmission devices 1 and 2b.

Once reading the programs from the ROM 91, the CPU 90 forms a wavelength acquisition section 900, a frequency difference calculation section 901, and a frequency difference notification section 902, as functions. The wavelength acquisition section 900 acquires the wavelengths λ1 and λ2 by receiving the notifications of the wavelengths λ1 and λ2 from the setting processing units 123 and 223 in the transmission devices 1 and 2b via the communication port 94. The wavelength acquisition section 900 outputs the acquired information on the wavelengths λ1 and λ2 to the frequency difference calculation section 901.

The frequency difference calculation section 901 calculates the difference Δfp between the frequencies f1p and f2p from the wavelengths λ1 and λ2. This calculation processing corresponds to the processing in Step St5 illustrated in FIG. 5. The frequency difference calculation section 901 notifies the frequency difference notification section 902 of the information on the difference Δfp. The frequency difference notification section 902 notifies the setting processing unit 233b of the difference Δfp through the communication port 94.

As described above, in this embodiment, the network monitoring and control device 9a calculates the difference Δfp, and thus the calculation processing load on the setting processing unit 233 is reduced.

Fourth Embodiment

The wavelength converter 23 using non-degenerate four-wave mixing is provided in the transmission devices 2, 2a, and 2b on the reception side in the first to third embodiments, but may be provided in the transmission device 1 on the transmission side.

Figure 9:
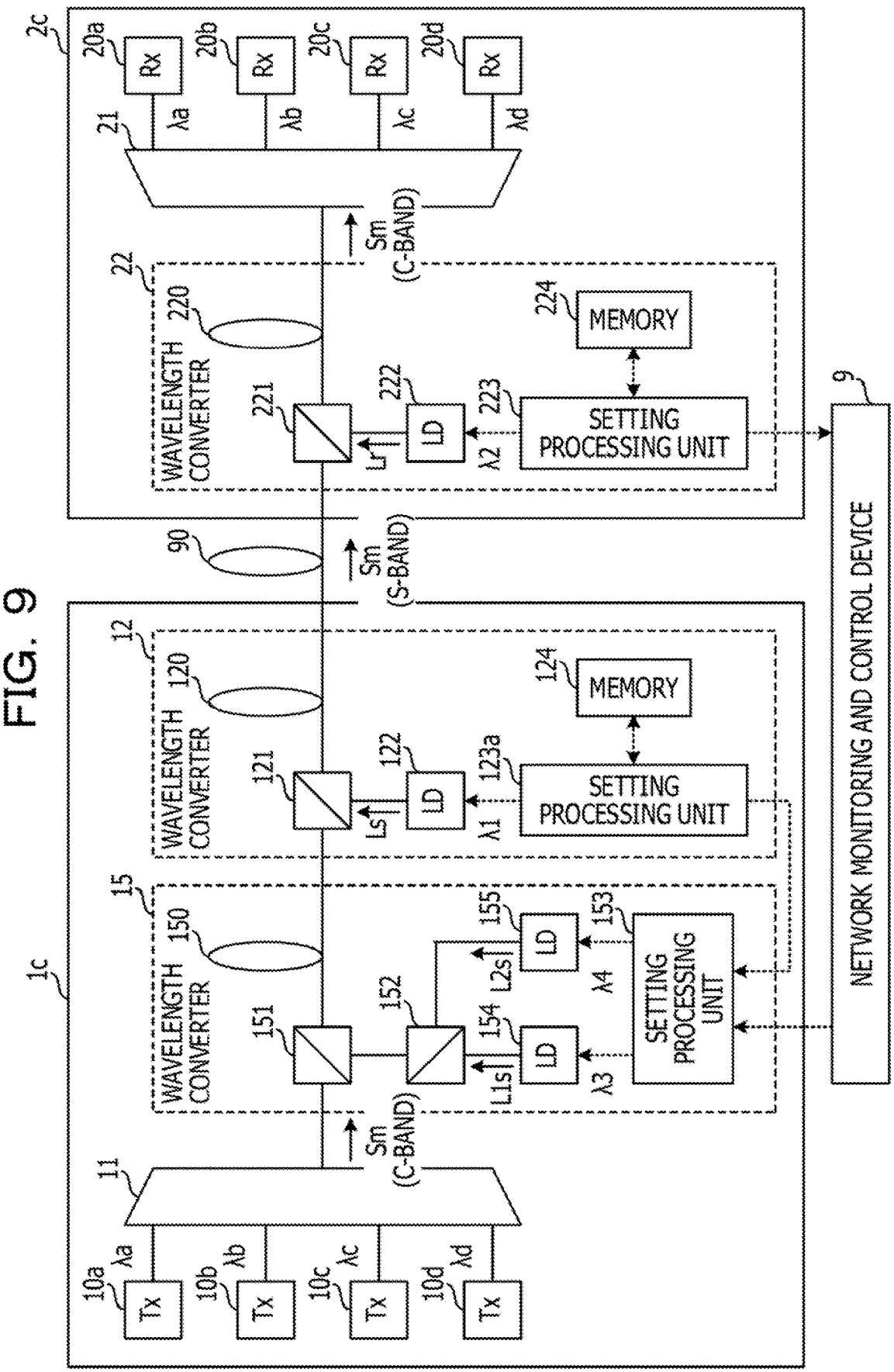
FIG. 9 is a configuration diagram illustrating a transmission system according to a fourth embodiment.

FIG. 9 is a configuration diagram illustrating a transmission system according to a fourth embodiment. In FIG. 9, constituents common to those in FIG. 3 are denoted by the same reference numerals, and description thereof is omitted.

The transmission system includes a transmission device 1c on the transmission side and a transmission device 2c on the reception side. The transmission device 1c on the transmission side transmits a wavelength multiplexed signal light Sm. The transmission device 2c on the reception side receives the wavelength multiplexed signal light Sm. The transmission device 2c is an example of a second transmission device, and the transmission device 1c is an example of a first transmission device.

The transmission device 2c on the reception side has a configuration obtained by omitting the wavelength converter 23 using non-degenerate four-wave mixing from the transmission device 2 of the first embodiment. The wavelength converter 22 using degenerate four-wave mixing is an example of a reception-side wavelength conversion unit.

The laser diode 222 is an example of a reception-side light source, and the excitation light Lr is an example of a first excitation light. The nonlinear fiber 220 is an example of a first nonlinear medium.

The transmission device 1c on the transmission side has a configuration obtained by adding a wavelength converter 15 using degenerate four-wave mixing to the transmission device 1 of the first embodiment. The wavelength converter 15 has the same configuration as that of the wavelength converter 23 described above.

The wavelength converter 15 includes a nonlinear fiber 150, a WDM coupler 151, a PBC 152, a setting processing unit 153, and laser diodes 154 and 155. The laser diode 154 is an example of a second light source, and outputs an excitation light L1s, which is an example of a third excitation light, to the PBC 152. The laser diode 155 is an example of a third light source, and outputs an excitation light L2s, which is an example of a fourth excitation light, to the PBC 152. The PBC 152 multiplexes the excitation lights L1s and L2s having polarizations orthogonal to each other and outputs the multiplexed light to the WDM coupler 151.

The WDM coupler 151 is coupled between the AWG 11 and the WDM coupler 121 in the wavelength converter 12. The WDM coupler 151 multiplexes the excitation lights L1s and L2s inputted from the PBC 152 with the wavelength multiplexed signal light Sm inputted from the AWG 11. The wavelength multiplexed signal light Sm and the excitation lights L1s and L2s are inputted to the nonlinear fiber 150.

The nonlinear fiber 150 causes four-wave mixing of the wavelength multiplexed signal light Sm and the excitation lights L1s and L2s. Thus, the wavelength converter 15 converts the wavelength band of the wavelength multiplexed signal light Sm in the same manner as the wavelength converter 23 described above. The wavelength converter 15 is an example of a second wavelength conversion unit, and the nonlinear fiber 150 is an example of a third nonlinear medium.

The setting processing unit 153 sets the wavelengths $\lambda 3$ and $\lambda 4$ of the excitation light L1s and L2s for the laser diodes 154 and 155. As in the case of the setting processing unit 233 described above, the setting processing unit 153 sets the wavelengths $\lambda 3$ and $\lambda 4$ of the excitation lights L1s and L2s so that the difference between the frequencies of the excitation lights L1s and L2s takes a value based on the difference $\Delta fs$ between the frequencies f1p and f2p converted from the zero-dispersion wavelengths ($\lambda 1$ and $\lambda 2$) of the nonlinear fibers 120 and 220.

The wavelength converter 12 converts the wavelength band of the wavelength multiplexed signal light Sm inputted from the wavelength converter 15 at the preceding stage by four-wave mixing of the excitation light Ls and the wavelength multiplexed signal light Sm in the nonlinear fiber 120. The wavelength converter 12 is an example of a first wavelength conversion unit.

The laser diode 122 is an example of a first light source, and the excitation light Ls is an example of a second excitation light. The nonlinear fiber 120 is an example of a second nonlinear medium.

With the above configuration, the transmission system of this embodiment may perform the same wavelength conversion as in the case where the excitation lights L1r and L2r are replaced with the excitation lights L1s and L2s in FIG. 4. The order of the wavelength conversion is the order of the conversion of reference numeral Gc, the conversion of reference numeral Ga, and the conversion of reference numeral Gb.

Therefore, according to the transmission system of this embodiment, the shift in the wavelength band of the wavelength multiplexed signal light Sm between the transmission side and the reception side may be reduced as in the above embodiment. Since the order of conversion of reference numerals Ga to Gc in FIG. 4 is not limited, the wavelength converter 12 may be provided between the wavelength converter 15 and the AWG 11, in the transmission device 1c on the transmission side.

(Configuration of Wavelength Converters 15 and 23)

Next, description is given of an optical circuit part of the configuration of the wavelength converters 15 and 23 using non-degenerate four-wave mixing.

Figure 10:
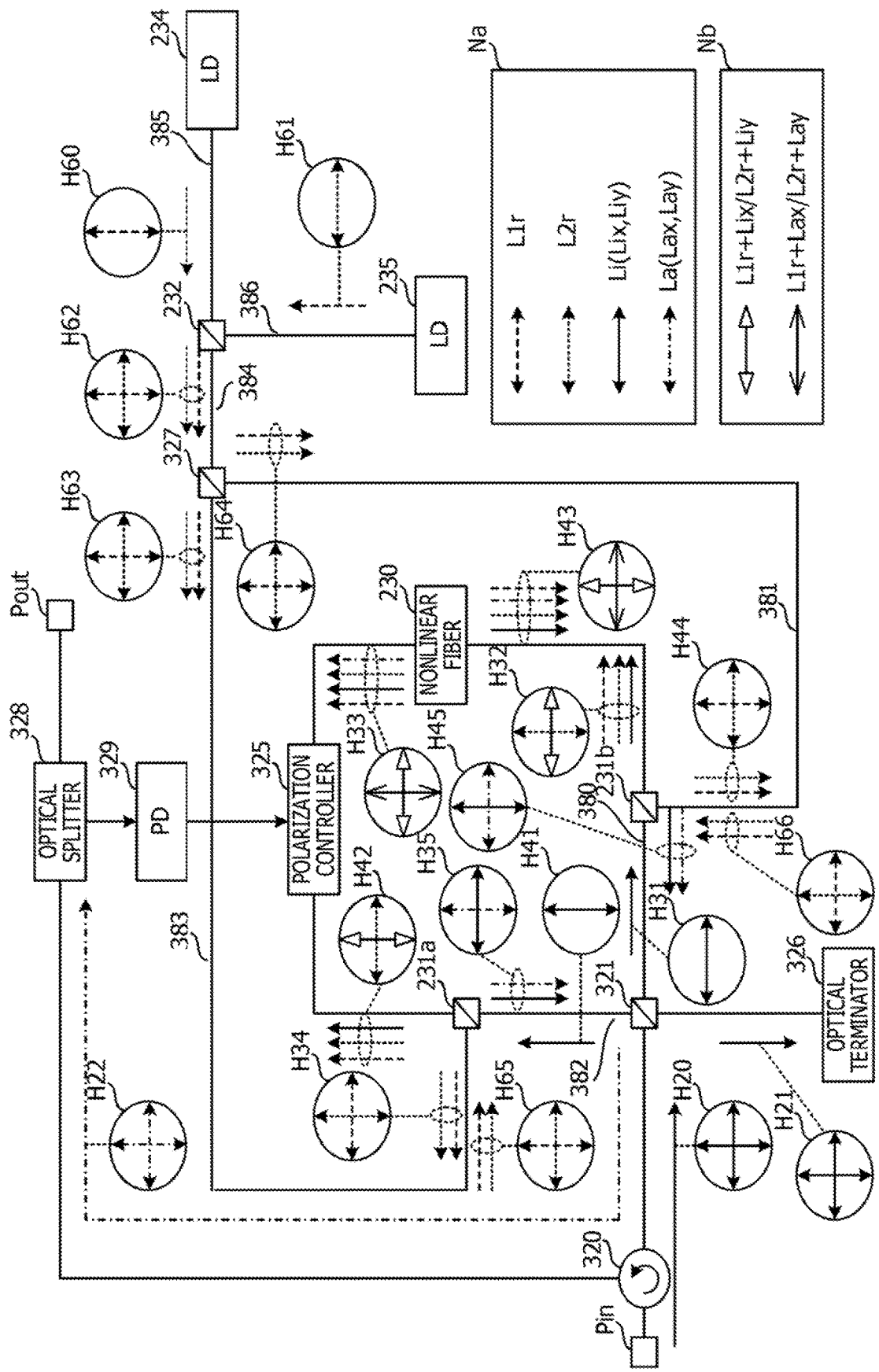
FIG. 10 is a configuration diagram illustrating an example of an optical circuit in the wavelength converter.

FIG. 10 is a configuration diagram illustrating an example of an optical circuit in the wavelength converter 23. The optical circuit in the wavelength converter 15 has the same configuration as that of the optical circuit in the wavelength converter 23.

Reference numerals H20 to H22, H31 to H35, H41 to H45, and H61 to H65 denote the polarization directions of input light Li, excitation lights L1r and L2r, and idler light La. The polarization direction is depicted with the horizontal direction on the paper as the X axis and the vertical direction on the paper as the Y axis. In the rectangular frame Na, arrows are depicted to represent the polarization directions of the input light Li that is the wavelength multiplexed signal light Sm before conversion, the idler light La that is the wavelength multiplexed signal light Sm after conversion, and the excitation lights L1r and L2r. In the rectangular frame Nb, arrows are depicted to represent the multiplexed light of the excitation lights L1r and L2r and polarization components Lix and Liy of the input light Li in the X-axis direction and the Y-axis direction, and arrows are depicted to represent the multiplexed light of the excitation lights L1r and L2r and polarization components Lax and Lay of the idler light La in the X-axis direction and the Y-axis direction.

The optical circuit of the wavelength converter 23 includes an input port Pin, an output port Pout, an optical circulator 320, a PBC 232, a polarization beam splitter (PBS) 321, WDM couplers 231a and 231b, a nonlinear fiber 230, and a polarization controller 325, an optical terminator 326, optical splitters 327 and 328, a photodiode (PD) 329, laser diodes 234 and 235, and polarization maintaining fibers 380 to 386. The WDM couplers 231a and 231b correspond to the WDM coupler 231 described above.

The input light Li is inputted from the input port Pin, passes through the optical circulator 320, and is inputted to the PBS 321. The input port Pin is coupled to the output port of the AWG 11. The input light Li includes polarization components Lix and Liy in the X-axis direction and the Y-axis direction, as indicated by reference numeral H20.

The PBS 321 separates two polarization components Lix and Liy orthogonal to each other from the input light Li. The polarization component Lix in the X-axis direction is inputted from the PBS 321, passes through the polarization maintaining fiber 380, and is inputted to the WDM coupler 231b, as indicated by reference numeral H31. The polarization component Liy in the Y-axis direction is inputted from the PBS 321, passes through the polarization maintaining fiber 382, and is inputted to the WDM coupler 231a, as indicated by reference numeral H41.

The laser diode 234 outputs the excitation light L1r, which is polarized in the X-axis direction, as indicated by reference numeral H60. The excitation light L1r passes through the polarization maintaining fiber 385 from the laser diode 234 and enters into the PBC 232.

The laser diode 235 outputs the excitation light L2r, which is polarized in the Y-axis direction, as indicated by reference numeral H61. The excitation light L2r passes through the polarization maintaining fiber 386 from the laser diode 235 and enters into the PBC 232.

The PBC 232 performs polarization and multiplexing of the excitation lights L1r and L2r. The PBC 232 guides the multiplexed light of the excitation lights L1r and L2r to the optical splitter 327 via the polarization maintaining fiber 384, as indicated by reference numeral H62.

The optical splitter 327 splits the multiplexed light of the excitation lights L1r and L2r toward the two polarization maintaining fibers 383 and 381. One of the multiplexed light of the excitation lights L1r and L2r passes through the polarization maintaining fiber 383 and is inputted to the WDM coupler 231a, as indicated by reference numerals H63 and H65.

The other of the multiplexed light of the excitation lights L1r and L2r passes through the polarization maintaining fiber 381 and is inputted to the WDM coupler 231b, as indicated by reference numerals H64 and H66. Since the polarization maintaining fiber 381 rotates the polarization direction of the excitation lights L1r and L2r by 90 degrees, the difference between the coupling angles of the coupling end on the optical splitter 327 side and the coupling end on the WDM coupler 231b side is set to 90 degrees. Accordingly, the polarization direction of the excitation light L1r matches the polarization component Lix of the input light Li in the X-axis direction.

The WDM coupler 231a wavelength-multiplexes the multiplexed light of the excitation lights L1r and L2r with the polarization component Liy of the input light Li in the Y-axis direction. In the Y-axis direction, the excitation light L2r and the polarization component Liy are wavelength-multiplexed (see reference numeral Nb). The wavelength multiplexed light passes through the polarization controller 325 and is inputted to the nonlinear fiber 230, as indicated by reference numeral H42.

The nonlinear fiber 230 causes four-wave mixing of the multiplexed light of the excitation lights L1r and L2r and the polarization component Liy of the input light Li in the Y-axis direction to generate, from the excitation light L1r, a polarization component Lax in the X-axis direction of the idler light La having a frequency corresponding to the difference between the frequencies f3$p$ and f4$p$ of the excitation lights L1r and L2r. In the X-axis direction, the excitation light L1r and the polarization component Lax are wavelength-multiplexed (see reference numeral Nb).

The excitation lights L1r and L2r and the polarization components Liy and Lax are inputted from the nonlinear fiber 230 to the WDM coupler 231b, as indicated by reference numeral H43. The WDM coupler 231b has a wavelength separation function to separate and guide the excitation lights L1r and L2r to the polarization maintaining fiber 381, as indicated by reference numeral H44. The remaining polarization components Liy and Lax are inputted from the polarization maintaining fiber 380 to the PBS 321 as indicated by reference numeral H45.

The WDM coupler 231b wavelength-multiplexes the multiplexed light of the excitation lights L1r and L2r with the polarization component Lix of the input light Li in the X-axis direction. In the X-axis direction, the excitation light L1r and the polarization component Lix are wavelength-multiplexed (see reference numeral Nb). The wavelength multiplexed light is inputted to the nonlinear fiber 230, as indicated by reference numeral H32.

The nonlinear fiber 230 causes four-wave mixing of the multiplexed light of the excitation lights L1r and L2r and the polarization component Lix in the X-axis direction of the input light Li to generate, from the excitation light L2r, a polarization component Lay in the Y-axis direction of the idler light La having a frequency corresponding to the difference between the frequencies f3$p$ and f4$p$ of the excitation lights L1r and L2r. In the Y-axis direction, the excitation light L2r and the polarization component Lay are wavelength-multiplexed (see reference numeral Nb).

The excitation lights L1r and L2r and the polarization components Lix and Lay are inputted from the nonlinear fiber 230 to the polarization controller 325, and then to the WDM coupler 231a, as indicated by reference numeral H33. The WDM coupler 231a has a wavelength separation function to separate and guide the excitation lights L1r and L2r to the polarization maintaining fiber 383, as indicated by reference numeral H34. The remaining polarization components Lix and Lay are inputted from the polarization maintaining fiber 382 to the PBS 321 as indicated by reference numeral H35.

The PBS 321 receives the polarization components Lix and Liy of the input light Li in the X-axis direction and the Y-axis direction and the polarization components Lax and Lay of the idler light La in the X-axis direction and the Y-axis direction. The polarization components Lix and Liy of the input light Li in the X-axis direction and the Y-axis direction are guided from the PBS 321 to the optical terminator 326 as indicated by reference numeral H21. The optical terminator 326 terminates each of the polarization components. Thus, unwanted polarization components Lix and Liy are removed.

The idler light La, which is a multiplexed light of the polarization components Lax and Lay, is inputted from the PBS 321 to the optical circulator 320 and then guided to the optical splitter 328 as indicated by reference numeral H22. The optical splitter 328 branches the idler light La to the output port Pout and the PD 329. The output port Pout is coupled to the transmission line 90.

The PD 329 detects the power of the idler light La to feed back to the polarization controller 325. The polarization controller 325 controls the polarization angles of the input light Li and the excitation lights L1r and L2r so that the idler light La is not lost in the PBS 321 to achieve maximum power. The polarization controller 325 includes, for example, a circuit such as an ASIC and an optical waveguide.

Figure 11:
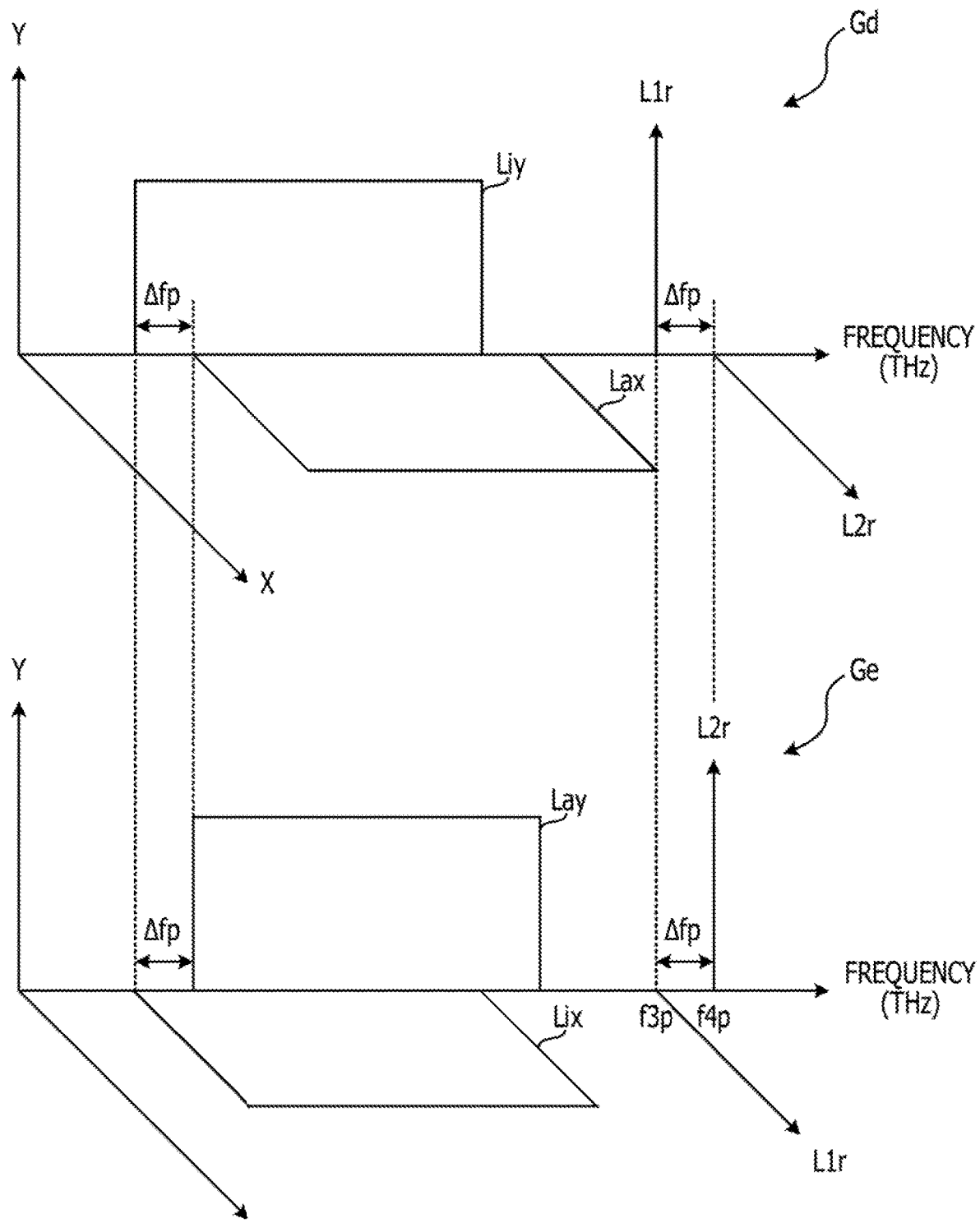
FIG. 11 illustrates how idler light is generated from excitation light.

FIG. 11 illustrates how the idler light La is generated from the excitation light L1r. Reference numeral Gd denotes an example where, in the optical circuit of FIG. 10, the polarization component Lax in the X-axis direction of the idler light La is generated from the polarization component Liy in the Y-axis direction of the input light Li that rotates clockwise through the polarization diversity loop.

The excitation lights L1r and L2r and the polarization component Liy the Y-axis direction of the input light Li are inputted from the WDM coupler 231a to the nonlinear fiber 230 (see reference numeral H42 in FIG. 10). In this event, the polarization directions of the excitation light L1r and the polarization component Liy are the Y-axis direction, and the polarization direction of the excitation light L2r is orthogonal to the polarization component. Liy. Therefore the four-wave mixing of the excitation lights L1r and L2r and the polarization component Liy of the input light Li in the Y-axis direction generates the polarization component Lax of the idler light La in the X-axis direction from the excitation light L1r.

The difference between the frequencies of the polarization components Liy and Lax is equal to the difference Δfp between the frequencies f3$p$ and f4$p$ of the excitation lights L1r and L2r. Therefore, when the wavelength multiplexed signal light Sm is inputted as the input light Li, the idler light La is obtained as the converted wavelength multiplexed signal light Sm.

Reference numeral Ge denotes an example where, in the optical circuit of FIG. 10, the polarization component Lay in the Y-axis direction of the idler light La is generated from the polarization component Lix in the X-axis direction of the signal light that rotates counterclockwise through the polarization diversity loop.

The excitation lights L1$r$ and L2$r$ and the polarization component Lix in the X-axis direction of the input light Li are inputted from the WDM coupler 231$b$ to the nonlinear fiber 230 (see reference numeral H32 in FIG. 10). As described above, the excitation light L1$r$ passes through the polarization maintaining fiber 381 and thus the polarization direction coincides with the polarization component. Lix, and the excitation light L2$r$ passes through the polarization maintaining fiber 381 and thus the polarization direction is orthogonal to the component Lix (see reference numeral H66 in FIG. 10). Therefore, the four-wave mixing of the excitation lights L1$r$ and L2$r$ and the polarization component Lix of the input light Li in the X-axis direction generates the polarization component Lay of the idler light La in the Y-axis direction from the excitation light L1$r$.

In either case of reference numeral Gd or Ge, the input light Li that is the wavelength multiplexed signal light Sm before conversion remains, but is removed by the PBS 321 (see reference numeral H21 in FIG. 10), thus suppressing generation of unwanted crosstalk light.

As described above, by making the polarization direction of one excitation light L1$r$ parallel to the polarization direction of the polarization components Liy and Lix of the input light Li and also making the polarization direction of the other excitation light L2$r$ orthogonal to the polarization directions of the polarization components Liy and Lix of the input light Li, the same conversion band and conversion efficiency may be obtained in either case of reference numeral Gd or Ge.

Fifth Embodiment

The transmission system of the above embodiments transmits the wavelength multiplexed signal light Sm in one direction, but may also transmit the wavelength multiplexed signal light in both directions.

Figure 12:
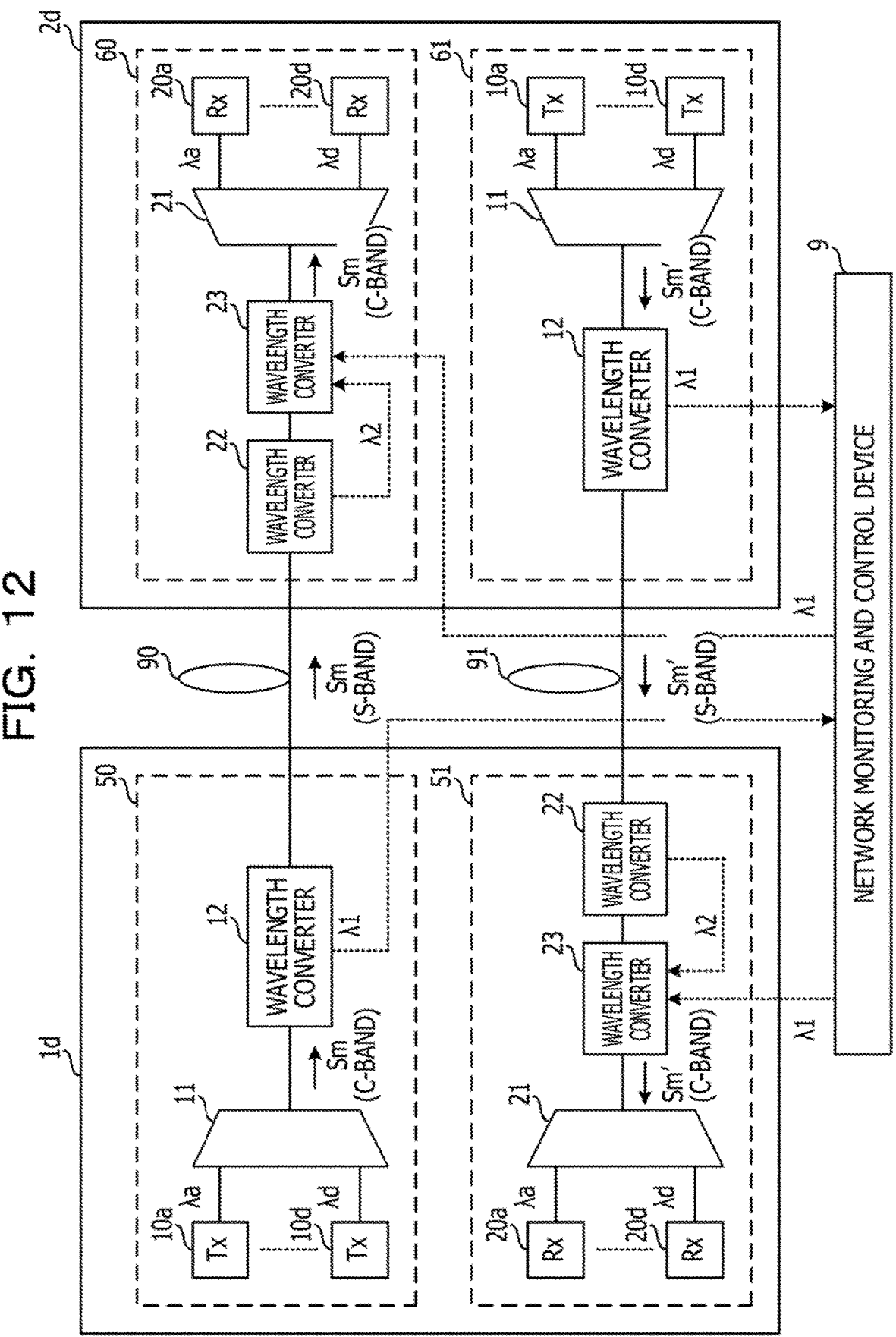
FIG. 12 is a configuration diagram illustrating an example of a transmission system according to a fifth embodiment.

FIG. 12 is a configuration diagram illustrating an example of a transmission system according to a fifth embodiment. In FIG. 12, constituents common to those in FIG. 3 are denoted by the same reference numerals, and description thereof is omitted.

The transmission system includes a pair of transmission devices 1$d$ and 2$d$ coupled to each other via two transmission lines 90 and 91, and a network monitoring and control device 9 for monitoring and controlling the transmission devices 1$d$ and 2$d$. The transmission device 1$d$ includes a transmission unit 50 and a reception unit 51, while the transmission device 2$d$ includes a transmission unit 61 and a reception unit 60. The transmission devices 1$d$ and 2$d$ are an example of first and second transmission devices.

The transmission units 50 and 61 are examples of a transmission processor and have the same configuration. The transmission units 50 and 61 each include a wavelength converter 12, an AWG 11, and transmitters 10$a$ to 10$d$. The transmission units 50 and 61 transmit wavelength multiplexed signal lights Sm and Sm' to the other transmission devices 2$d$ and 1$d$, respectively.

The reception units 51 and 60 are examples of a reception processor and have the same configuration. The reception units 51 and 60 each have wavelength converters 22 and 23, an AWG 21, and receivers 20$a$ to 20$d$. The reception units 51 and 60 receive the wavelength multiplexed signal lights Sm and Sm' from the other transmission devices 2$d$ and 1$d$, respectively.

The transmission units 50 and 61 use the wavelength converter 12 to convert the wavelength bands of the wavelength multiplexed signal lights Sm and Sm outputted from the AWG 11 from the C band to the S band, for example. The transmission units 50 and 61 output S-band wavelength multiplexed signal lights Sm and Sm' to transmission lines 90 and 91, respectively. The wavelength multiplexed signal lights Sm and Sm' are examples of a first wavelength multiplexed signal light and a second wavelength multiplexed signal light.

The wavelength multiplexed signal lights Sm and Sm' are inputted to the reception units 60 and 51 from the transmission lines 90 and 91, respectively. The reception units 60 and 51 use the wavelength converters 22 and 23 to convert the wavelength bands of the wavelength multiplexed signal lights Sm and Sm' from the S band to the C band, for example.

The network monitoring and control device 9 acquires the wavelength $\lambda 1$ from the wavelength converter 12 in the transmission unit 50 and notifies the wavelength converter 23 in the reception unit 60 of the acquired wavelength $\lambda 1$. The network monitoring and control device 9 acquires the wavelength $\lambda 1$ from the wavelength converter 12 in the transmission unit 61 and notifies the wavelength converter 23 in the reception unit 51 of the acquired wavelength $\lambda 1$.

The wavelength converter 23 in the reception unit 60 is notified of the wavelength $\lambda 1$ by the network monitoring and control device 9 and notified of the wavelength $\lambda 2$ by the wavelength converter 22. The wavelength converter 23 in the reception unit 60 sets the wavelengths $\lambda 3$ and $\lambda 4$ of the excitation lights L1$r$ and L2$r$ from the wavelengths $\lambda 1$ and $\lambda 2$ as described above.

The wavelength converter 23 in the reception unit 51 is notified of the wavelength $\lambda 1$ by the network monitoring and control device 9 and notified of the wavelength $\lambda 2$ by the wavelength converter 22. The wavelength converter 23 in the reception unit 51 sets the wavelengths $\lambda 3$ and $\lambda 4$ of the excitation lights L1$r$ and L2$r$ from the wavelengths $\lambda 1$ and $\lambda 2$ as described above.

In the transmission units 50 and 61, the wavelength converter 12 is an example of a first converter, which converts the wavelength bands of the wavelength multiplexed signal lights Sm and Sm' based on the wavelength $\lambda 1$ of the excitation light Ls by four-wave mixing of the excitation light Ls and the wavelength multiplexed signal lights Sm and Sm' inputted to the nonlinear fiber 120, as described above. The LD 122 is an example of a first light source, and the excitation light Ls is an example of a first excitation light. The nonlinear fiber 120 is an example of a first nonlinear medium.

In the reception units 60 and 51, the wavelength converter 22 is an example of a second converter, which converts the wavelength bands of the wavelength multiplexed signal lights Sm and Sm' based on the wavelength $\lambda 2$ of the excitation light Lr by four-wave mixing of the excitation light Lr and the wavelength multiplexed signal lights Sm and Sm' inputted to the nonlinear fiber 220, as described above. The LD 222 is an example of a second light source, and the excitation light Lr is an example of a second excitation light. The nonlinear fiber 220 is an example of a second nonlinear medium.

In the reception units 60 and 51, the wavelength converter 23 is an example of a third converter, which converts the wavelength bands of the wavelength multiplexed signal lights Sm and Sm' based on the difference between the frequencies of the excitation lights L1r and L2r by four-wave mixing of the excitation lights L1r and L2r and the wavelength multiplexed signal lights Sm and Sm' inputted to the nonlinear fiber 230, as described above. The LDs 234 and 235 are examples of third and fourth light sources, and the excitation lights L1r and L2r are examples of third and fourth excitation lights. The nonlinear fiber 230 is an example of a third nonlinear medium.

In the reception units 60 and 51, the setting processing unit 233 in the wavelength converter 23 acquires, via the network monitoring and control device 9, the zero-dispersion wavelength (wavelength λ1 of the excitation light Ls) of the nonlinear fiber 120 to be used by the other transmission devices 1d and 2d to convert the wavelength bands of the wavelength multiplexed signal lights Sm and Sm', as in the first embodiment. The nonlinear fibers 120 in the other transmission devices 1d and 2d are an example of a fourth nonlinear medium.

As described above, the setting processing unit 233 sets the wavelengths λ3 and λ4 of the excitation lights L1r and L2r so that the difference Δfp between the frequencies f3p and f4p of the excitation lights L1r and L2r takes a value based on the difference between the frequencies f1p and f2p. The setting processing unit 233 converts the zero-dispersion wavelength (wavelength λ1) of the nonlinear fiber 120 into the frequency f1p, and converts the zero-dispersion wavelength (wavelength λ2) of the nonlinear fiber 220 into the frequency f2p.

Therefore, in the transmission system in which the wavelength multiplexed signal lights Sm and Sm' are transmitted in both directions, the transmission devices 1d and 2d may reduce shifts in wavelength bands of the wavelength multiplexed signal lights Sm and Sm' with respect to the other transmission devices 2d and 1d.

As described with reference to FIG. 5, the setting processing unit 233 may set the wavelengths λ3 and λ4 of the excitation lights L1r and L2r such that the difference Δfp between the frequencies f3p and f4p of the excitation lights L1r and L2r is twice the difference between the frequencies f1p and f2p. Thus, the wavelength bands of the wavelength multiplexed signal lights Sm and Sm' may be matched with high accuracy between the transmission devices 1d and 2d.

Sixth Embodiment

Although the setting processing unit 233 of each of the transmission devices 1d and 2d acquires the wavelength λ1 from the setting processing unit 123 of the other transmission devices 2d and 1d via the network monitoring and control device 9 in the fifth embodiment, the embodiments are not limited thereto. As in the second embodiment, the information on the wavelength λ1 may be notified, for example, by a monitoring signal light Sc related to monitoring and control of the transmission devices 1d and 2d.

Figure 13:
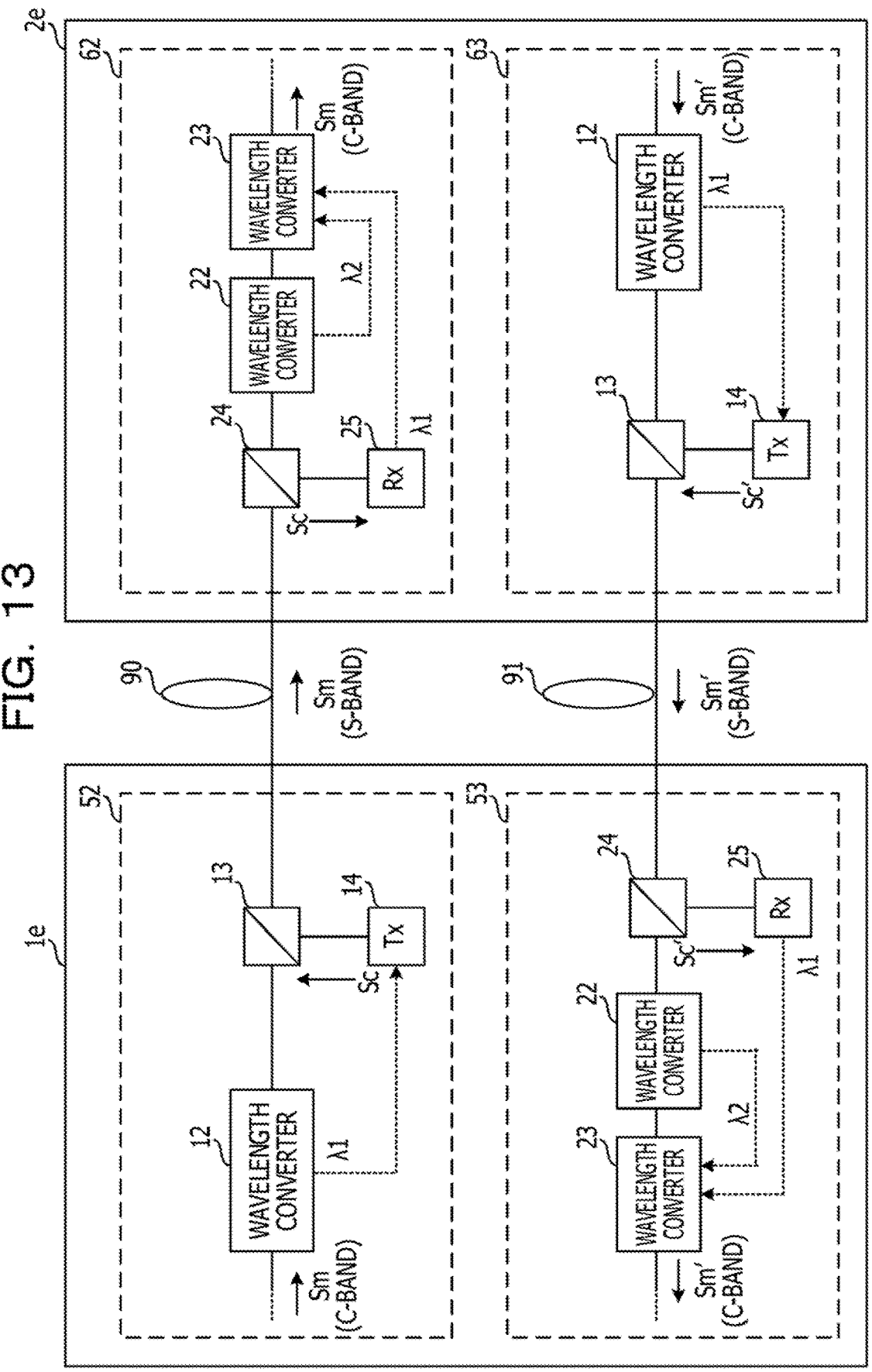
FIG. 13 is a configuration diagram illustrating an example of a transmission system according to a sixth embodiment.

FIG. 13 is a configuration diagram illustrating an example of a transmission system according to a sixth embodiment. In FIG. 13, constituents common to those in FIGS. 6 and 12 are denoted by the same reference numerals, and description thereof is omitted.

The transmission system includes a pair of transmission devices 1e and 2e coupled to each other via two transmission lines 90 and 91. The transmission device 1e includes a transmission unit 52 and a reception unit 53, while the transmission device 2e includes a transmission unit 63 and a reception unit 62. The transmission devices 1d and 2d are an example of first and second transmission devices.

The transmission units 52 and 63 are examples of a transmission processor and have the same configuration. The transmission units 52 and 63 each include a monitoring signal transmission unit (Tx) 14 and a WDM coupler 13 in addition to the configuration of the transmission units 50 and 61. The transmission units 52 and 63 transmit the wavelength multiplexed signal lights Sm and Sm' to the other transmission devices 2e and 1e, respectively. The illustration of the transmitters 10a to 10d and the AWG 11 is omitted.

The reception units 62 and 53 are examples of a reception processor and have the same configuration. The reception units 62 and 53 include a monitoring signal reception unit (Rx) 25 and a WDM coupler 24 in addition to the configuration of the reception units 60 and 51 described above. The reception units 62 and 53 receive the wavelength multiplexed signal lights Sm and Sm' from the other transmission devices 2d and 1d, respectively. The illustration of the receivers 20a to 20d and the AWG 21 is omitted.

The transmission units 52 and 63 multiplex the monitoring signal lights Sc and Sc' with the wavelength multiplexed signal lights Sm and Sm' and transmit the multiplexed light to the reception units 62 and 53. The monitoring signal lights Sc and Sc' include wavelength information indicating the wavelength λ1 of the excitation light Ls, for example, the zero-dispersion wavelength of the nonlinear fiber.

In the transmission units 52 and 63, the monitoring signal transmission unit 14 is an example of a transmission unit, which generates the monitoring signal light Sc including the wavelength information on the wavelength λ1 inputted from the setting processing unit 123a in the wavelength converter 12, and outputs the monitoring signal light Sc to the WDM coupler 13. The WDM coupler 13 is coupled between the nonlinear fiber 120 in the wavelength converter 12 and the transmission lines 90 and 91. The WDM coupler 13 multiplexes the monitoring signal light Sc inputted from the monitoring signal transmission unit 14 with the wavelength multiplexed signal light Sm and Sm' inputted from the nonlinear fiber 120. The multiplexed light of the wavelength multiplexed signal light Sm and the monitoring signal light Sc is outputted to the transmission lines 90 and 91 and is inputted to the reception units 62 and 53 from the transmission lines 90 and 91.

In the reception units 62 and 53, the WDM coupler 24 is coupled between the WDM coupler 221 in the wavelength converter 22 and the transmission lines 90 and 91. The WDM coupler 24 separates the wavelength multiplexed signal lights Sm and Sm' and the monitoring signal lights Sc and Sc' from the multiplexed light inputted from the transmission lines 90 and 91. The wavelength multiplexed signal lights Sm and Sm' are inputted to the WDM coupler 221 in the wavelength converter 22, and the monitoring signal lights Sc and Sc' are inputted to the monitoring signal reception unit 25.

The monitoring signal reception unit 25 is an example of a reception unit, which receives the monitoring signal light Sc from the transmission device 1a. The setting processing unit 233a in the wavelength converter 23 acquires the wavelength λ1 of the excitation light Ls from the wavelength information included in the monitoring signal light, and converts the wavelength λ1 into the frequency f1p.

The setting processing unit 233a acquires the wavelength λ2 of the excitation light Lr, for example, the zero-dispersion wavelength of the nonlinear fiber 220, from the setting processing unit 223 of the other wavelength converter 22, and converts the wavelength λ2 into the frequency f2p. Thus, the setting processing unit 233a calculates the difference Δfp between the frequencies f1p and f2p of the excitation lights Ls and Lr.

Thus, in this embodiment, the setting processing unit 233a may acquire the wavelength λ1 of the excitation light Ls of the wavelength converter 12 in the transmission device 1a on the transmission side without going through the network monitoring and control device 9. Therefore, the setting processing unit 233a may acquire the wavelength λ1 with low delay.

Seventh Embodiment

The wavelength converters 23 using non-degenerate four-wave mixing are provided in the reception units 51, 53, 60, and 62 in the fifth and sixth embodiments, but may be provided in the transmission units 50, 52, 61, and 63 as in the fifth embodiment.

Figure 14:
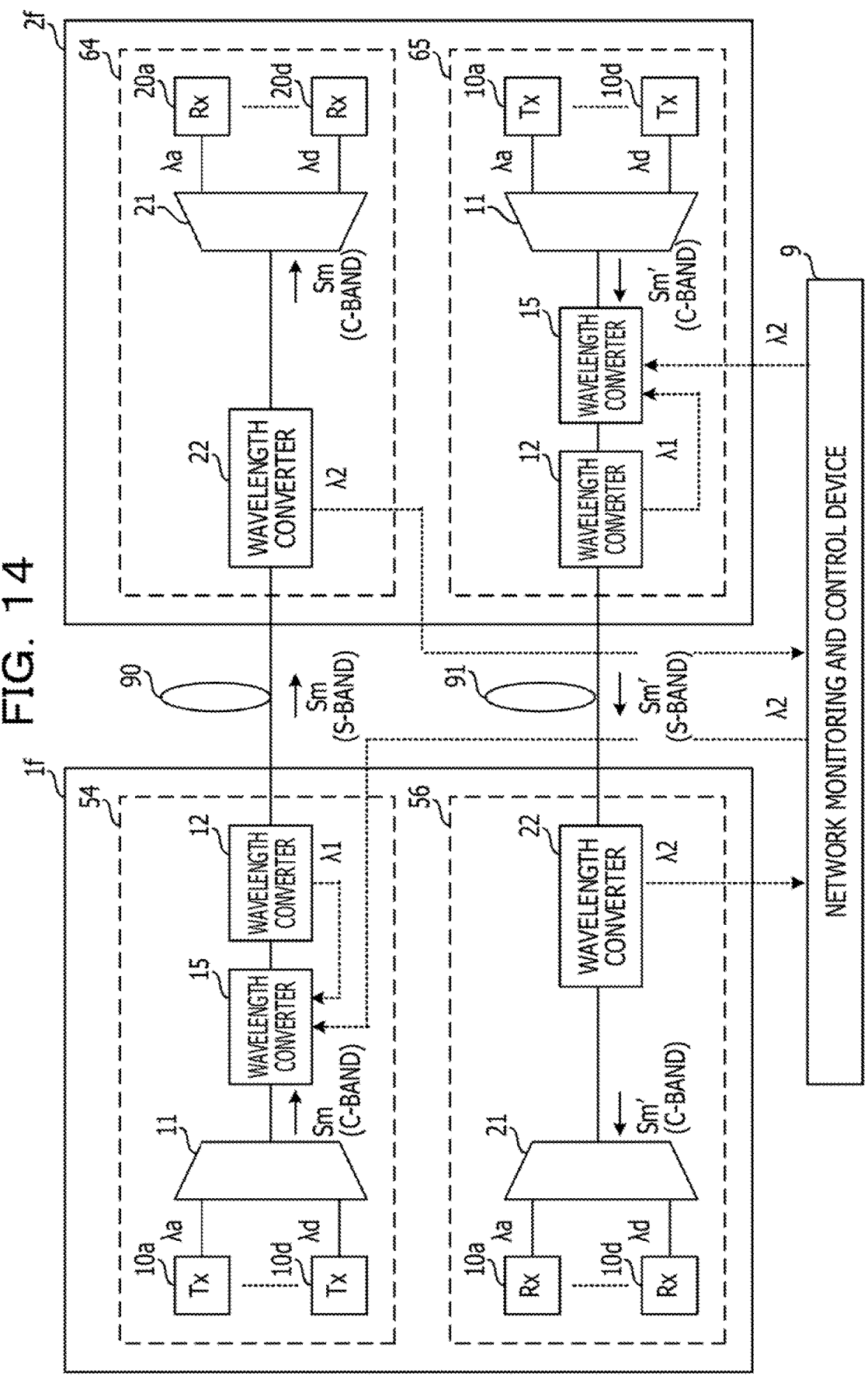
FIG. 14 is a configuration diagram illustrating an example of a transmission system according to a seventh embodiment.

FIG. 14 is a configuration diagram illustrating an example of a transmission system according to a seventh embodiment. In FIG. 14, constituents common to those in FIGS. 9 and 12 are denoted by the same reference numerals, and description thereof is omitted.

The transmission system includes a pair of transmission devices 1f and 2f coupled to each other via two transmission lines 90 and 91, and a network monitoring and control device 9 for monitoring and controlling the transmission devices 1f and 2f. The transmission device 1f includes a transmission unit 54 and a reception unit 56, while the transmission device 2f includes a transmission unit 65 and a reception unit 64. The transmission devices 1f and 2f are an example of first and second transmission devices.

The transmission units 54 and 65 are an example of a transmission processor and have the same configuration. The transmission units 54 and 65 each include a wavelength converter 15 in addition to the configuration of the transmission units 50 and 61. The wavelength converter 15 is coupled between the AWG 11 and the wavelength converter 12. The transmission units 54 and 65 transmit the wavelength multiplexed signal lights Sm and Sm' to the other transmission devices 2f and 1f, respectively.

The reception units 64 and 56 are an example of a reception processor and have the same configuration. The reception units 64 and 56 have a configuration obtained by omitting the wavelength converter 23 from the configuration of the reception units 60 and 51 described above. The reception units 64 and 56 receive the wavelength multiplexed signal lights Sm and Sm' from the other transmission devices 1f and 2f, respectively.

The network monitoring and control device 9 acquires the wavelength λ2 from the wavelength converter 22 in the reception unit 56 and notifies the wavelength converter 15 in the transmission unit 65 of the acquired wavelength λ2. The network monitoring and control device 9 acquires the wavelength λ2 from the wavelength converter 22 in the reception unit 64 and notifies the wavelength converter 15 in the transmission unit 54 of the acquired wavelength λ2.

The wavelength converter 15 in the transmission unit 65 is notified of the wavelength λ2 by the network monitoring and control device 9 and notified of the wavelength λ2 by the wavelength converter 12. The wavelength converter 15 in the transmission unit 65 sets the wavelengths λ3 and λ4 of the excitation lights L1s and L2s from the wavelengths λ1 and λ2 as described above.

The wavelength converter 15 in the transmission unit 54 is notified of the wavelength λ2 by the network monitoring and control device 9 and notified of the wavelength λ1 by the wavelength converter 12. The wavelength converter 15 in the transmission unit 54 sets the wavelengths λ3 and λ4 of the excitation lights L1s and L2s from the wavelengths λ1 and λ2 as described above.

Thus, the setting processing unit 153 in the wavelength converter 15 acquires, via the network monitoring and control device 9, the zero-dispersion wavelength of the nonlinear fiber 220 used by the other transmission devices 1f and 2f to convert the wavelength band of the wavelength multiplexed signal lights Sm and Sm'. The nonlinear fiber 220 is an example of a fourth nonlinear medium. As described above, the setting processing unit 153 sets the wavelengths λ3 and λ4 of the excitation lights L1s and L2s so that the difference between the frequencies of the excitation lights L1s and L2s takes a value based on the difference Δfs between the frequencies f1p and f2p converted from the zero-dispersion wavelengths (λ1 and λ2) of the nonlinear fibers 120 and 220.

Therefore, in the transmission system of this embodiment, as in the fifth embodiment, the transmission devices 1f and 2f may reduce the shift in wavelength band between the wavelength multiplexed signal lights Sm and Sm' of the other transmission devices 2f and 1f.

The wavelength converters 22 in the reception units 64 and 56 are an example of a first wavelength conversion unit. The LD 222 is an example of a first light source, and the excitation light Lr is an example of a first excitation light. The nonlinear fiber 220 is an example of a first nonlinear medium.

The wavelength converters 12 of the transmission units 54 and 65 are an example of a second wavelength conversion unit. The LD 122 is an example of a first light source, and the excitation light Ls is an example of a second excitation light. The nonlinear fiber 120 is an example of a second nonlinear medium.

The wavelength converters 15 of the transmission units 54 and 65 are an example of a third wavelength conversion unit. The LDs 154 and 155 are examples of a third light source and a fourth light source, and the excitation lights L1s and L2s are examples of the third excitation light and the fourth excitation light. The nonlinear fiber 150 is an example of a third nonlinear medium.

(Application Examples of Wavelength Converters 12, 22, and 23)

Next, description will be given of an example where the wavelength converters 12, 22, and 23 are applied to a transmission system for multiplexing and transmitting each of the S-band, C-band, and L-band wavelength multiplexed signal lights.

Figure 15:
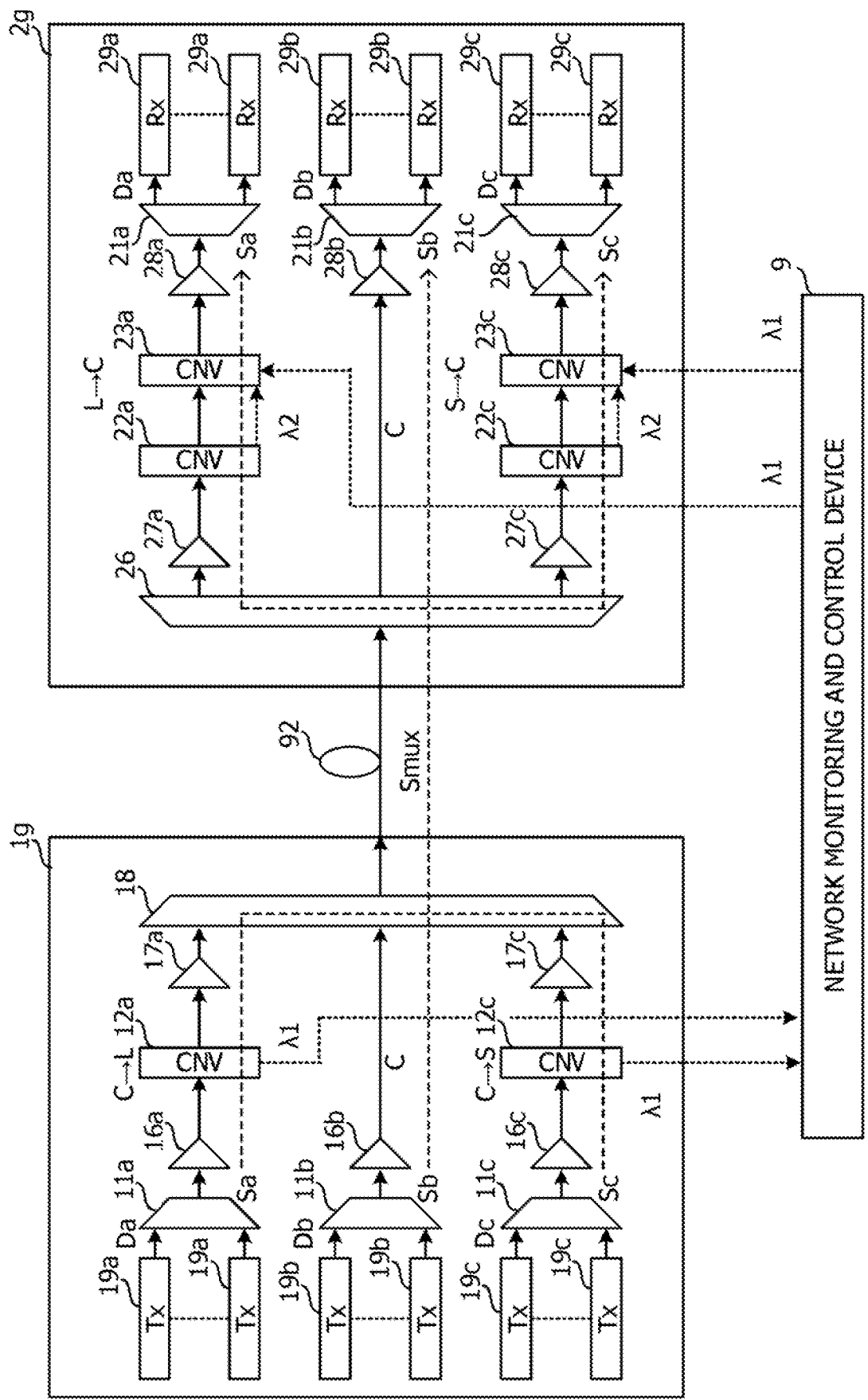
FIG. 15 is a configuration diagram illustrating an example of a transmission system for multiplexing and transmitting wavelength multiplexed signal light in S-, C-, and L-bands.

FIG. 15 is a configuration diagram illustrating an example of a transmission system for multiplexing and transmitting wavelength multiplexed signal lights in S-, C-, and L-bands. The transmission system includes a transmission device 1g on the transmission side, a transmission device 2g on the reception side, and a network monitoring and control device 9 for monitoring and controlling the transmission devices 1g and 2g. The transmission device 1g on the transmission side multiplexes each of the C-band, L-band, and S-band wavelength multiplexed signal lights Sa to Sc to generate a multiplexed light Smux, and transmits the generated multiplexed light to the transmission device 2g on the reception side through a transmission line 90 as indicated by the dotted lines.

The transmission device 1g on the transmission side includes transmitters 19a to 19c, AWGs 11a to 11c, optical amplifiers 16a to 16c, 17a, and 17c, wavelength converters (CNVs) 12a and 12c, and a multiplexer 18. The wavelength converter 12a has the same configuration as that of the wavelength converter 12, and converts the wavelength band of the wavelength multiplexed signal light Sa from the C band to the L band. The wavelength converter 12c has the same configuration as that of the wavelength converter 12, and converts the wavelength band of the wavelength multiplexed signal light Sc from the C band to the S band.

The transmitter 19a, the AWG 11a, the optical amplifiers 16a and 17a, and the wavelength converter 12a are provided on the path of the wavelength multiplexed signal light Sa. Each transmitter 19a has the same configuration as that of the transmitters 10a to 10d, generates a main signal light Da having a wavelength in the C band, and outputs the generated light to the AWG 11a.

The transmitter 19b, the AWG 11b, and the optical amplifier 16b are provided on the path of the wavelength multiplexed signal light Sb. Each transmitter 19b generates a main signal light Db having a wavelength in the C band and outputs the generated light to the AWG 11b.

The transmitter 19c, the AWG 11c, the optical amplifiers 16c and 17c, and the wavelength converter 12c are provided on the path of the wavelength multiplexed signal light Sc. Each transmitter 19c generates a main signal light Dc having a wavelength in the C band and outputs the generated light to the AWG 11c. The transmitters 19a to 19c are coupled to a client-side local area network (LAN) or the like, respectively, and generate main signal lights Da to Dc from a client signal such as an Ethernet (registered trademark, the same applies hereinafter) signal.

The AWG 11a multiplexes the main signal light Da inputted from each transmitter 19a to generate a C-band wavelength multiplexed signal light Sa and outputs the generated light to the optical amplifier 16a. As in the case of the AWG 11a, the AWG 11b generates the C-band wavelength multiplexed signal light Sb from the main signal light Db and outputs the generated light to the optical amplifier 16b, while the AWG 11c generates the C-band wavelength multiplexed signal light Sc from the main signal light Dc and outputs the generated light to the optical amplifier 16c.

The optical amplifier 16a amplifies the wavelength multiplexed signal light Sa and outputs the amplified signal light to the wavelength converter 12a. The optical amplifier 16b amplifies the wavelength multiplexed signal light Sb and outputs the amplified signal light to the multiplexer 18. The optical amplifier 16c amplifies the wavelength multiplexed signal light Sc and outputs the amplified signal light to the wavelength converter 12c. The optical amplifiers 16a to 16c are, for example, erbium doped optical fiber amplifiers (EDFAs).

The wavelength converter 12a converts the wavelength band of the wavelength multiplexed signal light Sa from the C band to the L band, while the wavelength converter 12c converts the wavelength band of the wavelength multiplexed signal light Sc from the C band to the S band. The wavelength converters 12a and 12c output the wavelength multiplexed signal lights Sa and Sc to the multiplexer 18, respectively.

The multiplexer 18 multiplexes the wavelength multiplexed signal lights Sa and Sc inputted from the wavelength converters 12a and 12c with the wavelength multiplexed signal light Sb inputted from the optical amplifier 16b, and outputs the multiplexed light Smux to the transmission line 92. The multiplexer 18 is, for example, an optical coupler.

Thus, the transmission device 1g on the transmission side multiplexes the L-band wavelength multiplexed signal light Sa, the C-band wavelength multiplexed signal light Sb, and the S-band wavelength multiplexed signal light Sc obtained by wavelength-multiplexing the plurality of main signal lights Da to Dc, and transmits the multiplexed light Smux to the transmission device 2g on the reception side.

The transmission device 2g on the reception side includes receivers 29a to 29c, AWGs 21a to 21c, optical amplifiers 27a, 27c, and 28a to 28c, a demultiplexer 26, and wavelength converters 22a, 22c, 23a, and 23c. The wavelength converters 22a and 22c have the same configuration as that of the wavelength converter 22, and the wavelength converters 23a and 23c have the same configuration as that of the wavelength converter 23. The wavelength converters 22a and 23a convert the wavelength band of the wavelength multiplexed signal light Sa from the L band to the C band. The wavelength converters 22c and 23c convert the wavelength band of the wavelength multiplexed signal light Sc from the S band to the C band.

The multiplexed light Smux is inputted from the transmission line 92 to the demultiplexer 26. The demultiplexer 26 demultiplexes the multiplexed light Smux for each wavelength band and outputs the demultiplexed lights from different ports. The demultiplexer 26 is, for example, an optical splitter.

The L-band wavelength multiplexed signal light Sa is inputted from the demultiplexer 26 to the optical amplifier 27a. The optical amplifier 27a amplifies the wavelength multiplexed signal light Sa. The wavelength multiplexed signal light Sa is inputted from the optical amplifier 27a to the wavelength converter 22a, and is inputted from the wavelength converter 22a to the wavelength converter 23a. The wavelength converters 22a and 22b convert the wavelength band of the wavelength multiplexed signal light Sa from the band to the C band, and output the C band wavelength multiplexed signal light Sa to the optical amplifier 28a. The optical amplifier 28a amplifies the wavelength multiplexed signal light Sa and outputs the amplified light to the AWG 21a.

The S-band wavelength multiplexed signal light Sc is inputted to the optical amplifier 27c from the demultiplexer 26. The optical amplifier 27c amplifies the wavelength multiplexed signal light Sc. The wavelength multiplexed signal light Sc is inputted from the optical amplifier 27c to the wavelength converter 22c, and is inputted from the wavelength converter 22c to the wavelength converter 23c. The wavelength converter 23c converts the wavelength band of the wavelength multiplexed signal light Sc from the S band to the C band, and outputs the C-band wavelength multiplexed signal light Sc to the optical amplifier 28c. The optical amplifier 28c amplifies the wavelength multiplexed signal light Sc and outputs it to the AWG 21c.

The C-band wavelength multiplexed signal light Sb is inputted to the optical amplifier 28b from the demultiplexer 26. The optical amplifier 28b amplifies the wavelength multiplexed signal light Sb and outputs the amplified light to the AWG 21b. The optical amplifiers 27a, 27c, and 28a to 28c are, for example, EDFAs.

The AWG 21a demultiplexes the wavelength multiplexed signal light Sa into main signal light Da for each wavelength and outputs each main signal light Da to the receiver 29a. The AWG 21b demultiplexes the wavelength multiplexed signal light Sb into main signal light Db for each wavelength, and outputs each main signal light Db to the receiver 29b. The AWG 21c demultiplexes the wavelength multiplexed signal light Sc into main signal light Dc for each wavelength, and outputs each main signal light Dc to the receiver 29c.

The receivers 29a to 29c have the same configuration as that of the receivers 20a to 20d, and receive the main signal lights Da to Dc, respectively. The receivers 29a to 29c are coupled to a LAN on the client side to generate client signals from the main signal lights Da to Dc, for example, and transmit the generated client signals to the LAN.

The network monitoring and control device 9 acquires the wavelength $\lambda 1$ from the wavelength converter 12a and notifies the wavelength converter 23a of the acquired wavelength $\lambda 1$. The network monitoring and control device 9 also acquires the wavelength $\lambda 1$ from the wavelength converter 12c and notifies the wavelength converter 23c of the acquired wavelength $\lambda 1$.

The wavelength converter 23a is notified of the wavelength $\lambda 1$ by the network monitoring and control device 9, and notified of the wavelength $\lambda 2$ by the wavelength converter 22a. The wavelength converter 23a sets the wavelengths $\lambda 3$ and $\lambda 4$ of the excitation lights L1r and L2r from the wavelengths $\lambda 1$ and $\lambda 2$ as described above.

Thus, as in the case of the above embodiments, the shift in the wavelength band of the wavelength multiplexed signal light Sa is reduced between the transmitter 19a and the receiver 29a.

The wavelength converter 23c is notified of the wavelength $\lambda 1$ by the network monitoring and control device 9, and notified of the wavelength $\lambda 2$ by the wavelength converter 22c. The wavelength converter 23c sets the wavelengths $\lambda 3$ and $\lambda 4$ of the excitation lights L1r and L2r from the wavelengths $\lambda 1$ and $\lambda 2$ as described above.

Therefore, as in the case of the above embodiments, the shift in the wavelength band of the wavelength multiplexed signal light Sc is reduced between the transmitter 19c and the receiver 29c. Although the network monitoring and control device 9 acquires the wavelength $\lambda 1$ from the wavelength converters 12a and 12c and notifies the wavelength converters 23a and 23c of the wavelength $\lambda 1$ in this embodiment, the embodiments are not limited thereto. For example, as in the second embodiment, the WDM coupler 13 and the monitoring signal transmission unit 14 may be provided in the transmission device 1g and the WDM coupler 24 and the monitoring signal reception unit 25 may be provided in the transmission device 2g, and the monitoring signal transmission unit 14 may transmit the monitoring signal light Sc to the monitoring signal reception unit 25 to notify the wavelength $\lambda 1$.

Although the wavelength converters 23a and 23c using non-degenerate four-wave mixing are provided in the transmission device 2g on the reception side in this embodiment, the wavelength converters may be provided in the transmission device 1g on the transmission side, as in the fourth embodiment. The network monitoring and control device 9 may calculate the difference $\Delta fp$ between the frequencies f1p and f2p and notify the wavelength converters 23a and 23c of the calculated difference as in the third embodiment.

Although the nonlinear fibers 120, 220, and 230 are used as means for generating four-wave mixing in the above embodiments, the embodiments are not limited thereto and another nonlinear medium such as silicon photonics may be used.

The foregoing embodiment is a preferred embodiment of the present disclosure. The embodiment, however, is not limited to the foregoing and may be variously changed and modified without departing from the gist of the disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical transmission device configured to receive wavelength multiplexed signal light from a first optical transmission device, the first-optical transmission device that converts wavelength band of the wavelength multiplexed signal light based on wavelength of a first excitation light by performing four-wave mixing on the first excitation light and the wavelength multiplexed signal light inputted to a first nonlinear medium, the optical transmission device comprising:

a first wavelength conversion circuit that includes a first light source and a second nonlinear medium, the first light source being a light source that outputs a second excitation light, the first wavelength conversion circuit being configured to convert the wavelength band of the wavelength multiplexed signal light based on wavelength of the second excitation light by performing four-wave mixing on the second excitation light and the wavelength multiplexed signal light inputted to the second nonlinear medium; and a second wavelength conversion circuit that includes a second light source and a third light source and a third nonlinear medium, the second light source being a light source that outputs a third excitation light, the third light source being a light source that outputs a fourth excitation light, the second wavelength conversion circuit being configured to convert the wavelength band of the wavelength multiplexed signal light based on a difference between the frequencies of the third excitation light and the fourth excitation light by performing four-wave mixing on the third excitation light and the fourth excitation light and the wavelength multiplexed signal light inputted to the third nonlinear medium, wherein the wavelength of the first excitation light is set to a zero-dispersion wavelength of the first nonlinear medium, the first wavelength conversion circuit is configured to set the wavelength of the second excitation light to a zero-dispersion wavelength of the second nonlinear medium, the second wavelength conversion circuit is configured to set the wavelengths of the third excitation light and the fourth excitation light so that the difference between the frequencies of the third excitation light and the fourth excitation light takes a value based on a difference between a frequency converted from the zero-dispersion wavelength of the first nonlinear medium and a frequency converted from the zero-dispersion wavelength of the second nonlinear medium.

2. The optical transmission device according to claim 1, wherein the second wavelength conversion circuit is configured to set the wavelengths of the third excitation light and the fourth excitation light so that the difference between the frequencies of the third excitation light and the fourth excitation light takes a value twice the difference between the frequency converted from the zero-dispersion wavelength of the first nonlinear medium and the frequency converted from the zero-dispersion wavelength of the second nonlinear medium.

3. The optical transmission device according to claim 1, further comprising: a reception circuit configured to receive a monitoring signal light multiplexed with the wavelength multiplexed signal light from the other optical transmission device, wherein
  the monitoring signal light includes wavelength information indicating the zero-dispersion wavelength of the first nonlinear medium,
  the second wavelength conversion circuit is configured to convert the zero-dispersion wavelength of the first nonlinear medium indicated by the wavelength information into a frequency.

4. An optical transmission device configured to transmit wavelength multiplexed signal light to a first optical transmission device, the first optical transmission device being configured to convert wavelength band of the wavelength multiplexed signal light based on wavelength of a first excitation light by performing four-wave mixing on the first excitation light and the wavelength multiplexed signal light inputted to a first nonlinear medium, the optical transmission device comprising:
  a first wavelength conversion circuit that includes a first light source and a second nonlinear medium, the first light source being configured to output a second excitation light, the first wavelength conversion circuit being configured to convert the wavelength band of the wavelength multiplexed signal light based on the wavelength of the second excitation light by performing four-wave mixing on the second excitation light and the wavelength multiplexed signal light inputted to the second nonlinear medium, and
  a second wavelength conversion circuit that includes a second light source and a third light source and a third nonlinear medium, the second light source being configured to output a third excitation light, the third light source being configured to output a fourth excitation light, the optical transmission device being configured to convert the wavelength band of the wavelength multiplexed signal light based on a difference between the frequencies of the third excitation light and the fourth excitation light by performing four-wave mixing on the third excitation light and the fourth excitation light and the wavelength multiplexed signal light inputted to the third nonlinear medium, wherein
  the wavelength of the first excitation light is set to a zero-dispersion wavelength of the first nonlinear medium,
  the first wavelength conversion circuit is configured to set the wavelength of the second excitation light to a zero-dispersion wavelength of the second nonlinear medium,
  the second wavelength conversion circuit is configured to set the wavelengths of the third excitation light and the fourth excitation light so that the difference between the frequencies of the third excitation light and the fourth excitation light takes a value based on a difference between a frequency converted from the zero-dispersion wavelength of the first nonlinear medium and a frequency converted from the zero-dispersion wavelength of the second nonlinear medium.

5. An optical transmission device comprising:
  an optical transmission processor configured to transmit a first wavelength multiplexed signal light to another optical transmission device; and
  an optical reception processor configured to receive a second wavelength multiplexed signal light from the other optical transmission device, wherein
  the optical transmission processor includes
    a first wavelength conversion circuit that includes a first light source and a first nonlinear medium, the first light source being a light source that outputs a first excitation light, the first wave length conversion circuit being configured to convert wavelength band of the first wavelength multiplexed signal light based on wavelength of the first excitation light by performing four-wave mixing on the first excitation light and the first wavelength multiplexed signal light inputted to the first nonlinear medium, and
  the optical reception processor includes
    a second wavelength conversion circuit that includes a second light source and a second nonlinear medium, the second light source being a light source that outputs a second excitation light, the second wavelength conversion circuit being configured to convert wavelength band of the second wavelength multiplexed signal light based on wavelength of the second excitation light by performing four-wave mixing on the second excitation light and the second wavelength multiplexed signal light inputted to the second nonlinear medium, and
    a third wavelength conversion circuit that includes a third light source and a fourth light source and a third nonlinear medium, the third light source being configured to output a third excitation light, the fourth light source being configured to output a fourth excitation light, the third wavelength conversion circuit being configured to convert the wavelength band of the second wavelength multiplexed signal light based on a difference between the frequencies of the third excitation light and the fourth excitation light by performing four-wave mixing on the third excitation light and the fourth excitation light and the second wavelength multiplexed signal light inputted to the third nonlinear medium, wherein
  the first wavelength conversion circuit is configured to set the wavelength of the first excitation light to a zero-dispersion wavelength of the first nonlinear medium,
  the second wavelength conversion circuit is configured to set the wavelength of the second excitation light to a zero-dispersion wavelength of the second nonlinear medium,
  the third wavelength conversion circuit is configured to
    acquire a zero-dispersion wavelength of a fourth nonlinear medium used by the other optical transmission device to convert the wavelength band of the second wavelength multiplexed signal light, and
    set the wavelengths of the third excitation light and the fourth excitation light so that the difference between the frequencies of the third excitation light and the fourth excitation light takes a value based on a difference between a frequency converted from the zero-dispersion wavelength of the fourth nonlinear medium and a frequency converted from the zero-dispersion wavelength of the second nonlinear medium.

6. The optical transmission device according to claim 5, wherein the third wavelength conversion circuit is configured to set the wavelengths of the third excitation light and the fourth excitation light so that the difference between the frequencies of the third excitation light and the fourth excitation light takes a value twice the difference between the frequency converted from the zero-dispersion wavelength of the fourth nonlinear medium and the frequency converted from the zero-dispersion wavelength of the second nonlinear medium.

7. The optical transmission device according to claim 5, wherein
the optical reception processor includes a reception circuit, the reception circuit being configured to receive a monitoring signal light multiplexed with the second wavelength multiplexed signal light from the other optical transmission device, wherein
the monitoring signal light includes wavelength information indicating the zero-dispersion wavelength of the fourth nonlinear medium,
the third wavelength conversion circuit is configured to convert the zero-dispersion wavelength of the fourth nonlinear medium indicated by the wavelength information into a frequency.

8. An optical transmission device comprising:
an optical transmission processor configured to transmit a first wavelength multiplexed signal light to another optical transmission device; and
an optical reception processor configured to receive a second wavelength multiplexed signal light from the other optical transmission device, wherein
The optical reception processor includes
a first wavelength conversion circuit that includes a first light source and a first nonlinear medium, the first light source being a light source that outputs a first excitation light, the first wavelength conversion circuit being configured to convert wavelength band of the second wavelength multiplexed signal light based on wavelength of the first excitation light by performing four-wave mixing on the first excitation light and the second wavelength multiplexed signal light inputted to the first nonlinear medium, and
the optical transmission processor includes
a second wavelength conversion circuit that includes a second light source and a second nonlinear medium, the second light source being a light source that outputs a second excitation light, the second wavelength conversion circuit being configured to convert wavelength band of the first wavelength multiplexed signal light based on wavelength of the second excitation light by performing four- wave mixing on the second excitation light and the first wavelength multiplexed signal light inputted to the second nonlinear medium, and
a third wavelength conversion circuit that includes a third light source and a fourth light source and a third nonlinear medium, the third light source being configured to output a third excitation light, the fourth light source being configured to output a fourth excitation light, the third wavelength conversion circuit being configured to convert the wavelength band of the first wavelength multiplexed signal light based on a difference between the frequencies of the third excitation light and the fourth excitation light by performing four-wave mixing of the third excitation light and the fourth excitation light and the first wavelength multiplexed signal light inputted to the third nonlinear medium, wherein the first wavelength conversion circuit is configured to set the wavelength of the first excitation light to a zero-dispersion wavelength of the first nonlinear medium,
the second wavelength conversion circuit is configured to set the wavelength of the second excitation light to a zero-dispersion wavelength of the second nonlinear medium,
the third wavelength conversion unit is configured to
acquire a zero-dispersion wavelength of a fourth nonlinear medium used by the other optical transmission device to convert the wavelength band of the first wavelength multiplexed signal light, and
set the wavelengths of the third excitation light and the fourth excitation light so that the difference between the frequencies of the third excitation light and the fourth excitation light takes a value based on a difference between a frequency converted from the zero-dispersion wavelength of the fourth nonlinear medium and a frequency converted from the zero-dispersion wavelength of the second nonlinear medium.

9. An optical transmission system comprising:
a first optical transmission device that transmits a wavelength multiplexed signal light; and
a second optical transmission device that receives the wavelength multiplexed signal light, wherein
the first optical transmission device includes
a transmission-side wavelength conversion circuit that includes a transmission-side light source and a first nonlinear medium, the transmission-side light source being a light source that outputs a first excitation light, the transmission-side wavelength conversion circuit being configured to convert wavelength band of the wavelength multiplexed signal light based on wavelength of the first excitation light by performing four-wave mixing on the first excitation light and the wavelength multiplexed signal light inputted to the first nonlinear medium, and
the second optical transmission device includes
a first wavelength conversion circuit that includes a first light source and a second nonlinear medium, the first light source being a light source that outputs a second excitation light, the first wavelength conversion circuit being configured to convert the wavelength band of the wavelength multiplexed signal light based on the wavelength of the second excitation light by performing four- wave mixing on the second excitation light and the wavelength multiplexed signal light inputted to the second nonlinear medium, and
a second wavelength conversion circuit that includes a second light source and a third light source and a third nonlinear medium, the second light source being a light source that outputs a third excitation light, the third light source being a light source that outputs a fourth excitation light, the second wavelength conversion circuit being configured to convert the wavelength band of the wavelength multiplexed signal light based on a difference between the frequencies of the third excitation light and the fourth excitation light by performing four-wave mixing on the third excitation light and the fourth excitation light and the wavelength multiplexed signal light inputted to the third nonlinear medium, wherein the transmission-side wavelength conversion circuit is configured to set the wavelength of the first excitation light to a zero-dispersion wavelength of the first nonlinear medium, the first wavelength conversion circuit is configured to set the wavelength of the second excitation light to a zero-dispersion wavelength of the second nonlinear medium, the second wavelength conversion circuit is configured to set the wavelengths of the third excitation light and the fourth excitation light so that the difference between the frequencies of the third excitation light and the fourth excitation light takes a value based on a difference between a frequency converted from the zero-dispersion wavelength of the first nonlinear medium and a frequency converted from the zero-dispersion wavelength of the second nonlinear medium.

10. An optical transmission system comprising:

a first optical transmission device that transmits a wavelength multiplexed signal light; and a second optical transmission device that receives the wavelength multiplexed signal light, wherein the second optical transmission device includes
  a reception-side wavelength conversion circuit that includes a reception-side light source and a first nonlinear medium, the reception-side light source being a light source that outputs a first excitation light, the reception-side wavelength conversion circuit being configured to convert wavelength band of the wavelength multiplexed signal light based on wavelength of the first excitation light by performing four-wave mixing on the first excitation light and the wavelength multiplexed signal light inputted to the first nonlinear medium, and the first optical transmission device includes
  a first wavelength conversion circuit that includes a first light source and a second nonlinear medium, the first light source being a light source that outputs a second excitation light, the first wavelength conversion circuit being configured to convert the wavelength band of the wavelength multiplexed signal light based on the wavelength of the second excitation light by performing four- wave mixing on the second excitation light and the wavelength multiplexed signal light inputted to the second nonlinear medium, and a second wavelength conversion circuit that includes a second light source and a third light source and a third nonlinear medium, the second light source being a light source that outputs a third excitation light, the third light source being a light source that outputs a fourth excitation light, the second wavelength conversion circuit being configured to convert the wavelength band of the wavelength multiplexed signal light based on a difference between the frequencies of the third excitation light and the fourth excitation light by performing four-wave mixing on the third excitation light and the fourth excitation light and the wavelength multiplexed signal light inputted to the third nonlinear medium, wherein the reception-side wavelength conversion circuit is configured to set the wavelength of the first excitation light to a zero-dispersion wavelength of the first nonlinear medium, the first wavelength conversion circuit is configured to set the wavelength of the second excitation light to a zero-dispersion wavelength of the second nonlinear medium, the second wavelength conversion circuit is configured to set the wavelengths of the third excitation light and the fourth excitation light so that the difference between the frequencies of the third excitation light and the fourth excitation light takes a value based on a difference between a frequency converted from the zero-dispersion wavelength of the first nonlinear medium and a frequency converted from the zero-dispersion wavelength of the second nonlinear medium.

* * * * *